United States Patent
Itoh et al.

(10) Patent No.: US 6,337,724 B1
(45) Date of Patent: *Jan. 8, 2002

(54) IMAGE DISPLAY SYSTEM

(75) Inventors: Toshio Itoh; Haruhiko Nagai; Tsunehiro Imamura; Takayoshi Semasa; Kenji Tatsumi; Shuji Iwata; Hiroshi Mitsuda; Yasuhito Myoi; Toshimasa Tomoda; Fumio Suzuki; Yoshisuke Ohtsuru, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/759,626

(22) Filed: Dec. 5, 1996

(30) Foreign Application Priority Data

Dec. 8, 1995 (JP) .................................. HEI. 7-320822

(51) Int. Cl.[7] ...................... G02F 1/1335; G02F 1/133; G03B 21/26
(52) U.S. Cl. ...................... 349/75; 349/73; 353/94
(58) Field of Search .......................... 349/73, 6, 7, 8, 349/62, 5, 65; 353/94, 74, 77, 78, 30, 34, 37; 359/455, 456, 854; 385/115, 116, 120, 121

(56) References Cited

U.S. PATENT DOCUMENTS

| | | | | |
|---|---|---|---|---|
| 4,578,672 A | * | 3/1986 | Oota et al. | 349/73 |
| 4,866,530 A | * | 9/1989 | Kalua | 353/94 |
| 5,085,495 A | * | 2/1992 | Iwahara et al. | 359/455 |
| 5,089,810 A | * | 2/1992 | Shapiro et al. | 340/701 |
| 5,116,117 A | * | 5/1992 | Miyashita | 353/94 |
| 5,299,039 A | * | 3/1994 | Bohannon | 349/143 |
| 5,589,956 A | * | 12/1996 | Morishima et al. | 359/15 |
| 5,664,353 A | * | 9/1997 | Brauer et al. | 40/560 |
| 5,673,091 A | * | 9/1997 | Boisdron et al. | 349/73 |
| 5,715,345 A | * | 2/1998 | McKinley | 385/115 |
| 5,765,934 A | * | 6/1998 | Okamori et al. | 353/94 |
| 5,812,223 A | * | 9/1998 | Noguchi | 349/9 |
| 5,812,226 A | * | 9/1998 | Izumi et al. | 349/73 |
| 5,897,192 A | * | 4/1999 | Seufert | 353/74 |

FOREIGN PATENT DOCUMENTS

| | | |
|---|---|---|
| JP | 1189688 | 7/1989 |
| JP | 737409 | 2/1995 |

* cited by examiner

Primary Examiner—William L. Sikes
Assistant Examiner—Dung Nguyen
(74) Attorney, Agent, or Firm—Birch, Stewart, Kolasch & Birch, LLP

(57) ABSTRACT

A plurality of liquid crystal modules is vertically and horizontally arranged, each of which is supplied light by a light source via optical fibers. A screen can be wound up at a cabinet. An image from each of the plurality of liquid crystal modules does not interfere one another because a light shielding board is installed.

28 Claims, 33 Drawing Sheets

Fig.8

| CORRECTION TABLE FOR FEATURE X1 ||
|---|---|
| IN (V) | OUT (V) |
| 0 | 0 |
| ⋮ | ⋮ |
| 1.8 | 4.0 |
| ⋮ | ⋮ |
| 2.3 | 4.3 |
| ⋮ | ⋮ |
| 4.0 | 4.5 |
| ⋮ | ⋮ |
| 6.0 | 5.3 |
| ⋮ | ⋮ |
| 7.3 | 5.7 |
| ⋮ | ⋮ |
| 8.2 | 6.0 |
| ⋮ | ⋮ |
| 10.0 | 10.0 |

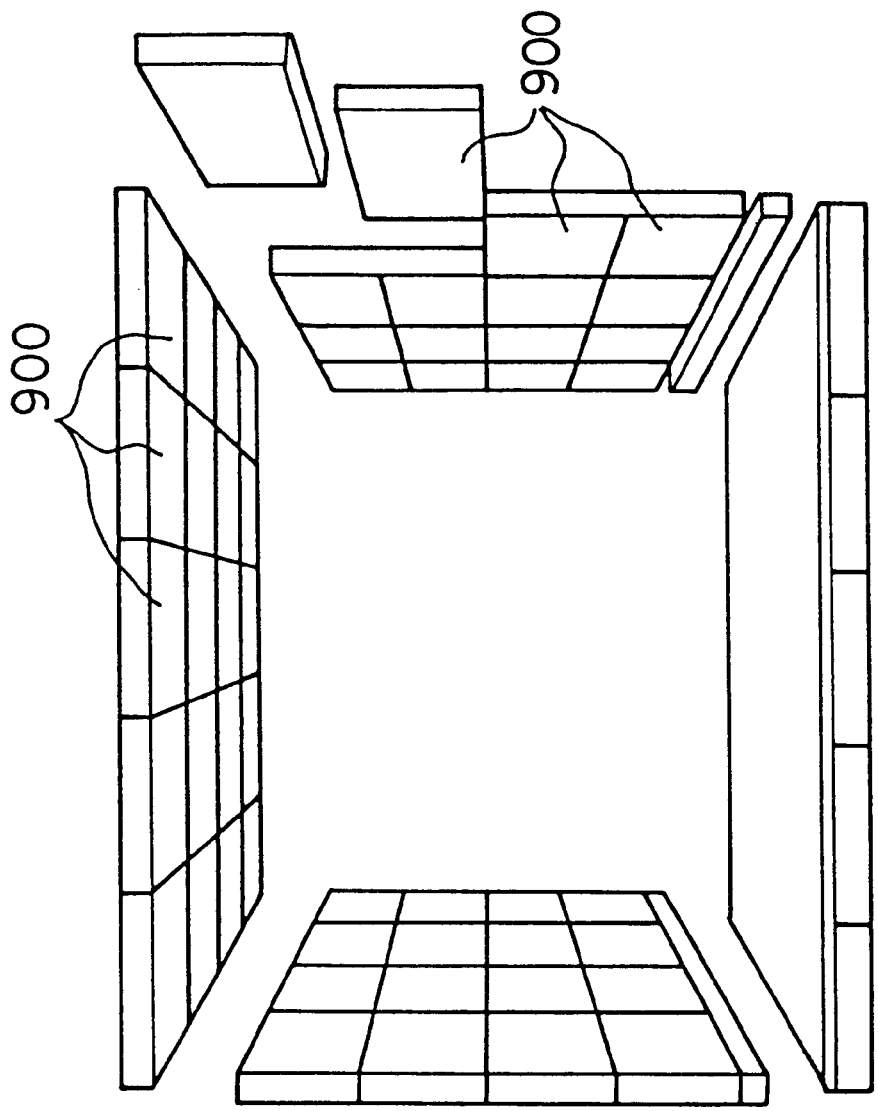

IMAGE DISPLAY SYSTEM

BACKGROUND OF THE INVENTION

1. Field of the Invention

The present invention relates to an image display system wherein plural liquid crystal panels are used. Particularly, this invention relates to a modular-type image display system which displays divided images made into one image.

2. Description of the Related Art

Conventionally, there has been a large-screen apparatus of cathode-ray tube (CRT) as shown in FIG. 28, as an apparatus for displaying a large-scale image. Size of a screen 1 in FIG. 28 is 37 inches. This display apparatus has a long depth D because a CRT 3 is used. It is difficult to largely reduce the depth D when the CRT 3 is used. Accordingly, it is difficult to obtain a thin-type display apparatus with using the CRT.

FIG. 29 shows a conventional large-scale display panel wherein fluorescent display tubes for respectively displaying each of three colors of red, green and blue (R, G, B) are used. The large-scale display panel is installed in a place where many people come together, such as a baseball stadium and a racetrack.

FIG. 30 shows a configuration of a projection television of reflective rear projection type described in the article, "Color Liquid Crystal Display" from Display Technique Series by Syunsuke Kobayashi, Sangyo Tosho, p. 203.

FIG. 31 illustrates a sectional configuration of the screen 1 of the projection television as shown in FIG. 30. This sectional configuration is disclosed in page 205 of the above article, "Color Liquid Crystal Display".

It is possible for the projection television as shown in FIG. 30 to generate a large-scale image more than 40 inches. However, the television may become very expensive because it is necessary to use a Fresnel lens 1001 and a lenticular plate 1002 for the screen as shown in FIG. 31. The Fresnel lens 1001 and the lenticular plate 1002 are used to get a high center gain for viewers watching the projection television. Since the screen 1 has the configuration as shown in FIG. 31, a visual characteristic with respect to horizontal direction (viewing direction) is enhanced. In addition, a filter, not shown, for blocking out ultraviolet rays radiated from a light source is also provided.

FIG. 32 shows a display apparatus for dividing one screen into four screens and displaying them. FIG. 33 illustrates an inside configuration of the display apparatus. Projection lenses 2a through 2d and CRTs 3a through 3d are respectively provided to be corresponding to divided partial screens 1a through 1d. A distributor 4 inputs an image signal I, divides the signal I into four, and respectively outputs divided image signals Ia through Id to the CRTs 3a through 3d. There exist borders L1 and L2 between the partial screens 1a through 1d. To remove the borders L1 and L2 is a problem to be solved.

The display apparatus applying the large-scale CRT shown in FIG. 28 has disadvantages that it is difficult to shorten the depth D so as to make the apparatus be a thin type, and it is difficult to generate a larger image because only one CRT is used for generating the image, so that an image being 37 inches is around the maximum.

In addition, the display system applying the fluorescent display tube shown in FIG. 29 has a disadvantage that it is necessary to replace a failed fluorescent display tube every time the tube fails. Particularly, as the display system is installed at a high place in baseball stadiums and racetracks, it is a dangerous and time-consuming work to exchange the failed fluorescent display tube.

Regarding the conventional projection television shown in FIGS. 30 and 31, shortening of the width has been realized by reflecting an optical path inside the cabinet. However, the shortening has not been accomplished enough for the projection television to be used in a room at a house. Moreover, since the screen has a special configuration applying the Fresnel lens 1001 and the lenticular plate 1002 in order to make the center gain be high, the price of the apparatus can not avoid being expensive. The Fresnel lens 1001 and the lenticular plate 1002 interfere each other, which brings about a defect of generating a vertically striped moire.

As stated above, the display apparatus applying plural small-sized CRTs shown in FIGS. 32 and 33 has a disadvantage that borders L1 and L2 exist between the partial screens 1a through 1d. Though small-sized CRTs 3a through 3d are used, it has not been accomplished to largely shorten the depth D. Namely, the shortening of the apparatus has not been realized.

Furthermore, as the CRT or the fluorescent display tube is used in the conventional display apparatus, there is a disadvantage that the weight of the apparatus itself becomes heavy. Therefore, it is difficult to easily carry or move the display apparatus once it was installed.

The present invention has been contrived in order to solve the above problems. It is an object of the invention to provide an image display system wherein a large-scale image can be generated.

It is another object of the present invention to provide an image display system which is thin enough to be utilized in a room at a house.

It is another object of the present invention to provide an image display system, the weight of whose apparatus is made to be light enough to be moved.

It is another object of the present invention to provide an image display system which is low-priced.

It is another object of the present invention to provide a flexible image display system whose screen size and whole shape of the screen can be variable.

It is another object of the present invention to provide an image display system wherein maintaining can be easily done in the case of failure.

SUMMARY OF THE INVENTION

According to one aspect of the present invention of an image display system includes a plurality of liquid crystal modules, each of which has a liquid crystal panel, for generating a plurality of partial images to compose a whole image, a screen for displaying the plurality of partial images generated by the plurality of liquid crystal modules, and a light supplier for supplying light to the liquid crystal panel at each of the plurality of liquid crystal modules.

According to another aspect of the present invention of the image display system, each of the plurality of liquid crystal modules includes a liquid crystal panel for color, a liquid crystal panel for luminance, and projection lenses for synthesizing light output from the liquid crystal panel for color and the liquid crystal panel for luminance.

According to another aspect of the present invention of the image display system, each of the plurality of liquid crystal modules further includes a polarization beam splitter for distributing light supplied by the light supplier to the liquid crystal panel for color and the liquid crystal panel for luminance.

According to another aspect of the present invention of the image display system, each of the plurality of liquid crystal modules includes a projection lens for projecting an image generated by the liquid crystal panel, and a reflective mirror located between the screen and the projection lens.

According to another aspect of the present invention of the image display system, the screen is a panel containing a diffusing material.

According to another aspect of the present invention of the image display system, the screen is curved inside like a letter U.

According to another aspect of the present invention of the image display system, the screen includes a plurality of partial screens respectively corresponding to each of the plurality of liquid crystal modules.

According to another aspect of the present invention of the image display system, the light supplier includes at least one light source for radiating light to the plurality of liquid crystal modules, and a distributor for distributing the light radiated from the at least one light source to the plurality of liquid crystal modules.

According to another aspect of the present invention of the image display system, the distributor includes a plurality of optical fiber cables for distributing the light from the at least one light source to each of the plurality of liquid crystal modules.

According to another aspect of the present invention of the image display system, each of the plurality of processors further includes a corrective circuit for correcting the partial image signal based on a display feature of each of the plurality of liquid crystal modules.

According to another aspect of the present invention of the image display system, a cabinet in which the plurality of liquid crystal modules is detachably arranged is included.

Other objects, features, and advantages of the invention will be apparent from the following description when taken in conjunction with the accompanying drawings.

BRIEF DESCRIPTION OF THE DRAWINGS

FIG. 8 shows a correction table of corrective circuit according to the present invention;

FIG. 21 shows a flat screen of the present invention;

DETAILED DESCRIPTION OF THE PREFERRED EMBODIMENTS

Figure 1:
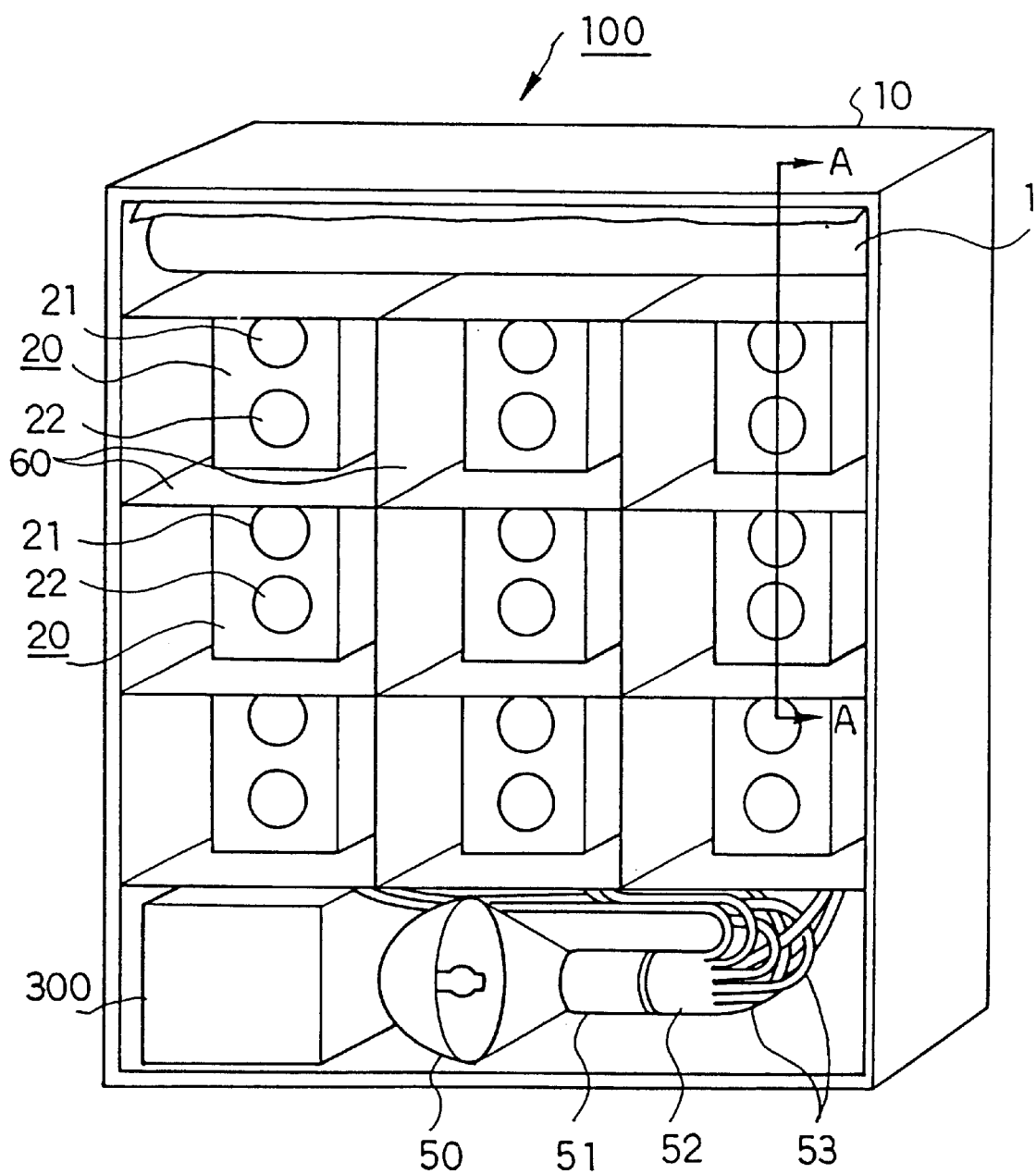
FIG. 1 shows an example of an image display system according to the present invention.

FIG. 1 shows an example of an image display system according to the present invention. FIG. 1 illustrates a state wherein a screen 1 is rolled up at the upper part of a cabinet 10 for showing the inside configuration. It is also possible to install the screen 1 which is detachable. When an image is actually displayed, the screen 1 covers the whole of an image display system 100. In the example of FIG. 1, liquid crystal modules 20 are arranged at an array of 3×3 in the cabinet 10. Projection lenses 21 and 22 are installed on each liquid crystal module 20. Images projected from the projection lenses 21 and 22 are synthesized to be projected from the back side of the screen 1. A controller 300 which wholly controls the image display system 100, and a light source 50 are provided inside the cabinet 10. Light radiated from the light source 50 passes through an integrator 51 and goes and branches to a plurality of optical fiber cables 53 via a cable-bundle 52. The integrator 51 makes the light from the light source 50 be uniform. Each of the optical fiber cables 53 supplies branched light to each liquid crystal module 20. Light shielding boards 60 provided between each liquid crystal module 20 are for avoiding light from one liquid crystal module interfering light from other liquid crystal module.

Figure 2:
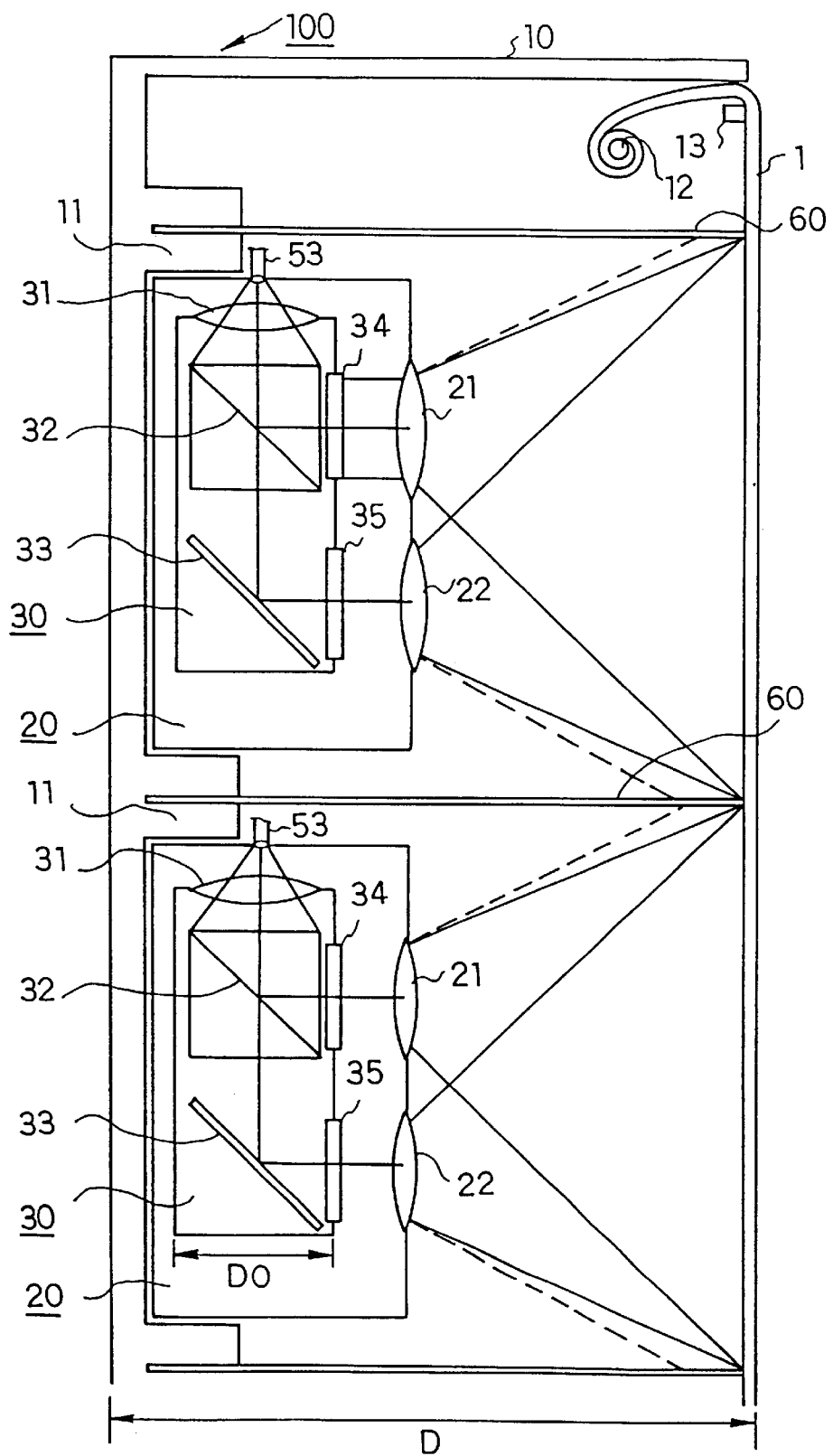
FIG. 2 shows a sectional side view of an image display system according to the present invention.

FIG. 2 shows a sectional view at a line A—A in FIG. 1. A winding shaft 12, which is rotated by a hand or a motor (not shown), for winding the screen 1 is installed in the cabinet 10. A bar 13 is installed for adjusting the screen 1 at the front side of the image display system 100. In the cabinet 10, plural fixing parts 11 are provided for installing the liquid crystal modules 20 at the cabinet 10. The installing of the liquid crystal modules 20 to the fixing parts 11 can be performed by a well-known attaching/detaching mechanism in which screws and magnets, etc. are used. The light shielding boards 60 are detachably installed at the fixing parts 11.

Since a light shown in dotted line is shielded by the light shielding board 60 in FIG. 2 for instance, the light is not interfered by other light from other liquid crystal module, which helps to generate a clear image. Regarding the thickness of the light shielding board 60, the thinner, the better. It is desirable to use a black steel plate which is 0.1 mm through 0.2 mm thick, for instance. If the light shielding board 60 is thick, a shadow of the board 60 is generated onto the screen. In the case of the thickness being 0.1 mm through 0.2 mm, no shadow is generated onto the screen. Namely, 0.1 mm through 0.2 mm is a range wherein no bad effect is generated for the image.

As stated above, the projection lenses 21 and 22 are installed at the liquid crystal module 20. Lights from the projection lenses 21 and 22 are projected onto the screen with being overlapped. The optical fiber cable 53 is connected to the liquid crystal module 20. An optical module 30 exists inside the liquid crystal module 20. A lens 31, a polarization beam splitter 32, and a reflective mirror 33 are serially placed in the optical module 30. A liquid crystal panel 34 for color is installed at the side of the polarization beam splitter 32 and a liquid crystal panel 35 for luminance is installed at the side of the reflective mirror 33. For the purpose of strengthening an output light from the liquid crystal panel 34 for color, it is desirable to set the panel 34 closer to light of the optical fiber cable 53 than the liquid crystal panel 35 for luminance to the light of the cable 53. If the relation of the arrangement positions of the liquid crystal panel 34 for color and the liquid crystal panel 35 for luminance is set reversely, the reflective mirror 33 does not totally reflect the light, which means light output from the reflective mirror 33 becomes weak. Namely, it is desirable to set the liquid crystal panel 34 for color at the side of the polarization beam splitter 32.

It is possible to shorten a depth D of the apparatus by serially arranging the optical fiber cable 53, the lens 31, the polarization beam splitter 32 and the reflective mirror 33 and by arranging the above serial plural parts parallel to the screen, as shown in FIG. 2. When the size of the liquid crystal panel 34 for color and the liquid crystal panel 35 for luminance is around 0.7 inches, a depth DO of the optical module 30 is merely around 1 inch. In this case, since depth of the part for generating the image can be within around 1 inch, it is possible to provide a very thin display apparatus comparing with the conventional display apparatus applying a cathode-ray tube (CRT). For instance, when the liquid crystal panels 34 and 35 of 0.7 inch are used, the depth D of the image display system 100 can be around 20 cm.

Figure 3:
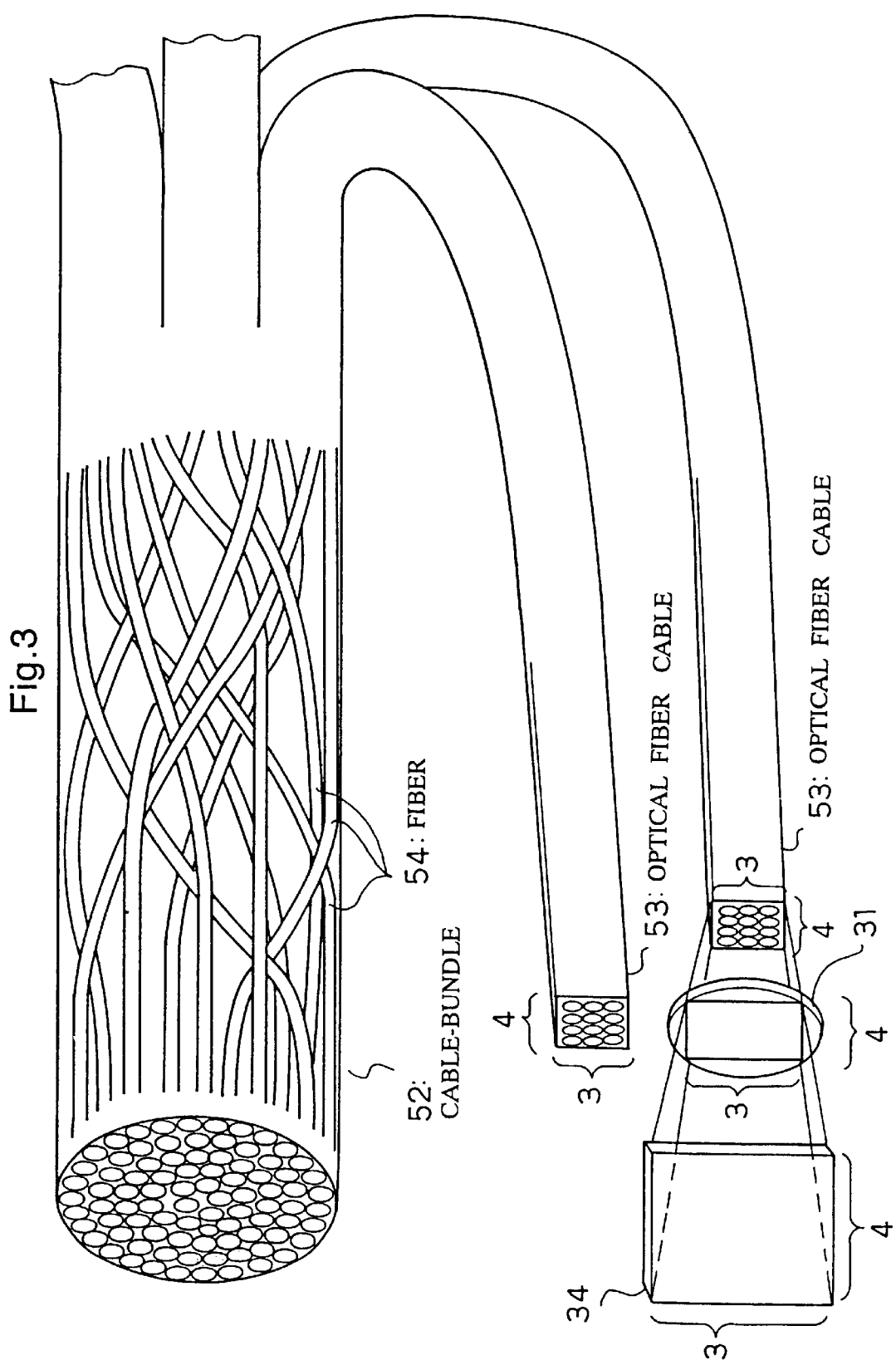
FIG. 3 shows an optical fiber cable according to the present invention.

FIG. 3 shows details of the optical fiber cable 53 shown in FIGS. 1 and 2. The cable-bundle 52 consists of fibers 54. As shown in FIG. 1, nine optical fiber cables 53 are necessary for separately supplying light to nine liquid crystal modules. If the optical fiber cable 53 is composed by bundling twelve fibers into one cable, total number of the fibers 54 is 9×12=108. Namely, in this case, the cable-bundle 52 consists of one hundred and eight fibers 54. A sectional shape of the cable-bundle 52 at the light source side is circle. Since the light source 50 includes a reflective mirror such as a rotative parabolic mirror or a rotative elliptic mirror, a sectional shape of a light radiated from the light source 50 is circle. In order to effectively absorb this light, it is desirable for sectional shapes of the integrator 51 and the cable-bundle 52 to be circle.

The number of the whole fibers is one hundred and eight in the above explanation so as to simplify the explanation of the structure. Actually, for instance, seven through ten thousand fibers are necessary to make distribution of optical strength be uniform. Depending upon diameter of the fiber, there is a case of tens of thousands of fibers being used to compose a cable-bundle.

It is desirable for a sectional shape of the optical fiber cable 53 to be the same shape as that of the liquid crystal panel. In the case of a ratio of length to width of the liquid crystal panel 34 for color being 3:4, it is desirable for a ratio of sectional shape of the optical fiber cable 53 to be a rectangle of 3:4. Namely, when the sectional shape of the optical fiber cable 53 is a rectangle of 3:4, light radiated from the optical fiber cable 53 can be effectively utilized for the liquid crystal panel 34.

In a common display apparatus applying a liquid crystal panel, luminous flux, whose sectional shape is circle, generated at the light source has a disadvantage that a circumferential part of the luminous flux is not projected onto the liquid crystal panel which is rectangle. However, according to the example of this embodiment, circular luminous flux is transformed to rectangle based on the array of the fibers 54 inside the optical fiber cable 53, so that all luminous flux is effectively projected. Since twelve fibers 54 are used for composing one optical fiber cable 53 in order to simplify the explanation in this example, luminous flux whose ratio of length to breadth is 3:4, being the same ratio as that of the liquid crystal panel, can be generated by arraying the fibers 54 to be 3×4. It is also acceptable to array thousands through tens of thousands of fibers to be integral multiplication of 3×4. Furthermore, it is also acceptable to generate luminous flux whose ratio of length to breadth is 3:4, by putting the fibers into a cable whose rectangular sectional shape has a ratio of length to breadth of 3:4.

If it is impossible to make the optical fiber cable 53 having the same ratio of length to breadth as that of the liquid crystal panel, luminous flux having the same ratio of length to breadth as that of the liquid crystal panel can be generated by changing a ratio of the luminous flux using the lens 31. For instance, in the case of nine fibers 54 composing the optical fiber cable 53, the fibers 54 are arrayed to be a square of 3×3. Then, luminous flux from the optical fiber cable 53 can be changed to have a ratio of 3:4, by being multiplied by 4/3 along the breadth direction using the lens 31, and the changed rectangular luminous flux is projected onto the liquid crystal panel 34.

Since the cable-bundle 52 is composed of plural fibers 54, it is possible to make light output from the optical fiber cable 53 be uniform by moderately and randomly braiding the fibers 54 inside the cable-bundle 52. If the optical fibers 54 are straightly arranged inside the cable-bundle 52 without being braided, light radiated from the light source 50, being not uniform, may be output to a specific optical fiber cable 53. There are a strong light part and a weak light part at the section in the light from the light source 50, namely the light is not uniform. For instance, a strong light is generated at the center part of the luminous flux and a weak one is at the circumferential part of it. If light is output from these parts directly to the optical fiber cable 53, different light being not uniform may be radiated from each optical fiber cable 53 to the liquid crystal panel. Therefore, an image generated by such a light may have irregular parts. Namely, uniform lights can be output from the plural optical fiber cables 53 by moderately braiding the fibers 54, which causes a uniform image to be generated by the liquid crystal panel.

It becomes unnecessary to use the integrator 51 of FIG. 1 which is for making the light radiated from the light source 50 be uniform, because the output light can be uniformed by moderately braiding the fibers 54.

A fiber of quartz or a fiber of plastic can be used as the fiber 54. When the fiber of plastic is used, ultraviolet rays can be blocked out. Therefore, a filter for blocking out the ultraviolet rays from the light source 50 becomes unnecessary.

An outstanding feature of the image display system 100 is that one light source is provided for plural liquid crystal modules 20, as shown in FIG. 1. Owing to supplying light to the plural liquid crystal modules from one light source, the whole apparatus can be lightened and the cost of the apparatus can be reduced. Besides, if a lamp of the light source fails, it can be overcome only by exchanging the lamp, so that the maintenance of the apparatus is easily performed.

In the case of the liquid crystal module 20 failing, the module 20 can be taken out from the front side of the image display system 100 when the screen is wound up or detached as shown in FIGS. 1 and 2, so that the maintenance is easily performed. If the cause of failing can not be found, it is possible to exchange the liquid crystal module 20 at the system. In addition, the exchanging of the failed lamp of the light source can be performed at the front side of the image display system 100. The light shielding board 60 is easily maintained because it is detachable.

Furthermore, the liquid crystal panel or the liquid crystal module 20 is lighter than the CRT. The whole image display system 100 can be lightened since only one light source is provided.

Figure 4:
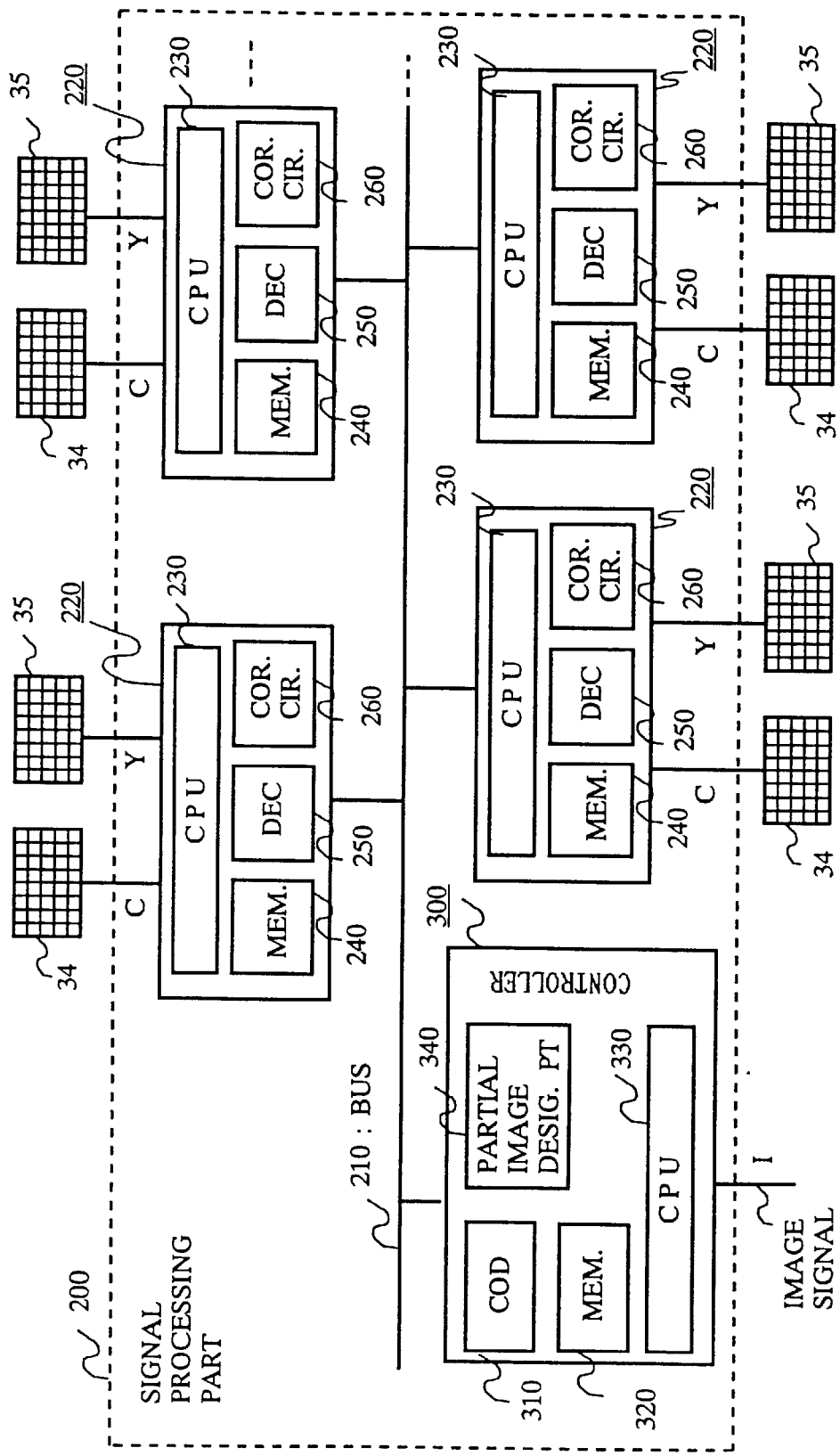
FIG. 4 shows a signal processing part according to the present invention.

FIG. 4 shows a configuration of a signal processing part 200 of the image display system of FIG. 1. A processor part 220, not shown in FIGS. 1 and 2, is respectively provided in each liquid crystal module 20. Each processor part 220 is connected one another by a bus 210 which is connected to the controller 300. The controller 300 inputs an image signal I from the outside, and outputs the input image signal to the bus 210 and a control signal for controlling the processor part 220 to the bus 210. The each processor part 220 inputs the image signal output from the controller 300 and extracts a partial image signal based on the control signal from the controller 300. Then, the each processor part 220 generates drive signals C and Y based on the extracted partial signal, and outputs them to the liquid crystal panel 34 for color and the liquid crystal panel 35 for luminance.

A coding part 310, a memory 320, a Central Processing Unit (CPU) 330 and a partial image designating part 340 are provided in the controller 300. The partial image designating part 340 designates a partial image to be extracted, for each processor part 220 based on the configuration of the image display system 100. For instance, in the case of an image of the image display system consisting of four partial images, the partial image designating part 340 designates each processor part to extract one fourth image. In the case of an image of the image display system consisting of nine partial images, the partial image designating part 340 designates each processor part to extract one ninth image. The partial image designating part 340 also designates each processor part which part of the image to extract. The each processor part has been programmed to extract a partial image whose range is designated by the partial image designating part 340. Since the partial image designating part 340 exists, it is not necessary to change the processor part 220 even when specification for image dividing is changed. Namely, the specification change can be flexibly realized.

Accordingly, even when the size, number of arrays or shape of the image display system is changed, an image can be displayed without changing each processor part 220, because the processor part 220 can extract a partial image designated by the partial image designating part 340, The coding part 310 of the controller 300 inputs the image signal I and outputs the signal to the bus 210 as a digital signal. The image signal output to the bus 210 is a signal for one screen. As stated above, each processor part 220 inputs only a partial image designated by the partial image designating part 340.

In the each processor part 220, a CPU 230, a memory 240, a decoding part 250 and a corrective circuit 260 are provided. The decoding part 250 decodes the image signal from the bus 210. The CPU 230 controls a decoding process of the decoding part 250. Namely, the CPU 230 designates a signal of a necessary partial image to display for the corresponding processor part and decodes the signal. The corrective circuit 260 corrects the drive signals C and Y in order to make features of plural liquid crystal panels be equal to a reference feature.

Figure 5:
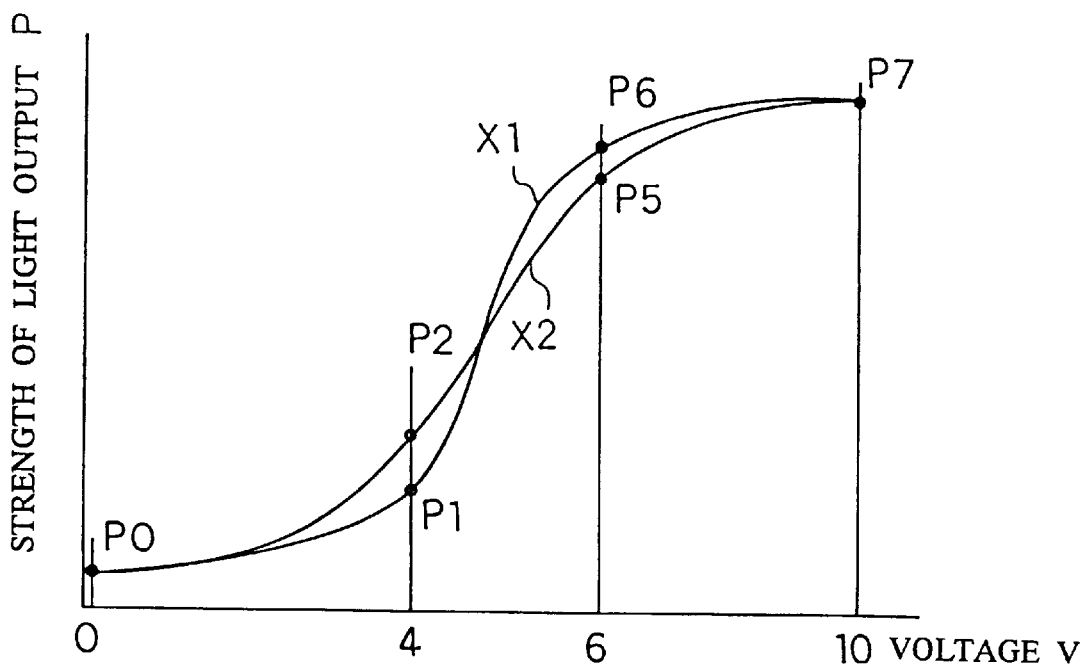
FIG. 5 shows features of liquid crystal panels according to the present invention.

FIG. 5 shows a feature of the liquid crystal panel. In FIG. 5, the lateral axis shows voltage V of the drive signal C or Y and the vertical axis shows strength P of light output from the liquid crystal panel. Each liquid crystal panel has its own feature. Two features X1 and X2 are shown in FIG. 5. For instance, when the voltage of the drive signal is 4V, the strength of the light output is P1 according to the feature X1, and the strength of that is P2 according to X2. Since there is a difference between P1 and P2 (P1≠P2), a different output is generated per partial image. Therefore, each liquid crystal panel should have an equal feature so as to keep the same color degree and brightness relating to neighboring partial images. The corrective circuit 260 is for making the features X1 and X2 of FIG. 5 be equal to the reference feature.

Figure 6:
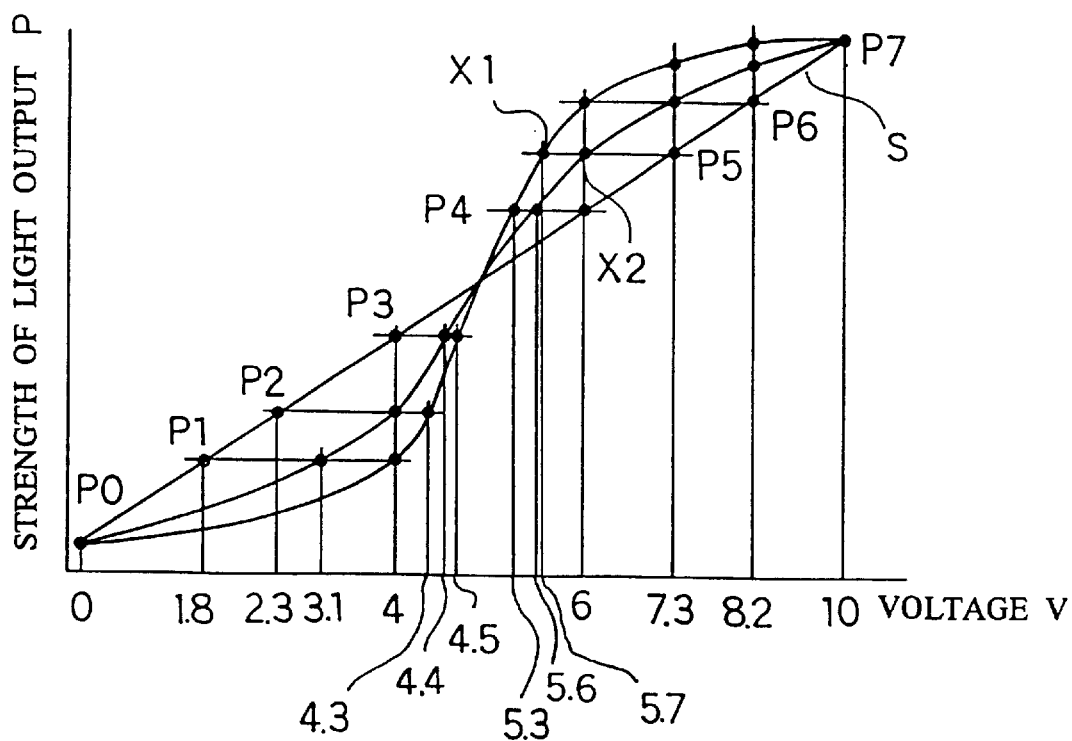
FIG. 6 illustrates operation of a corrective circuit according to the present invention.
Figure 7:
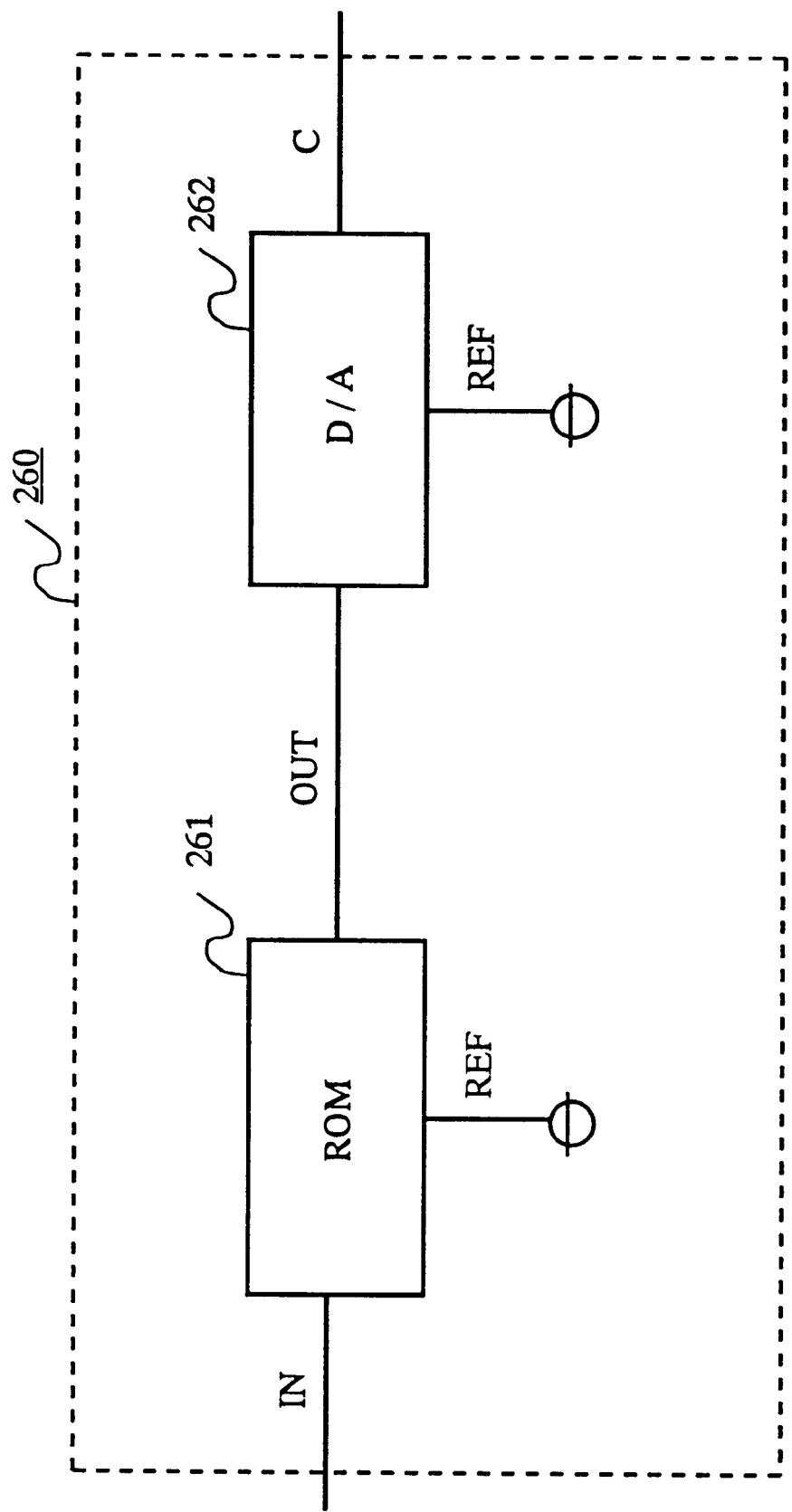
FIG. 7 shows one example of configuration of a corrective circuit according to the present invention.

FIG. 6 illustrates operation of the corrective circuit 260. The line from P0 to P7 in FIG. 6 shows a reference feature S. FIG. 7 shows a configuration of the corrective circuit 260. A Read Only Memory (ROM) 261 inputs a digital drive signal IN which is before correction and outputs a digital drive signal OUT which is after correction. A digital/analog convertor 262 converts the digital drive signal OUT to the analog drive signal C.

FIG. 8 is a correction table stored inside the ROM 261. The ROM 261 inputs a digital drive signal IN, refers a digital drive signal OUT based on the correction table of FIG. 8, and outputs the signal. For instance, as shown in FIG. 6, when the voltage of the drive signal is 4V, the strength of light output is P1 according to the feature X1, whereas the reference feature S indicates P3. In the case of the feature X1, a drive signal of 4.5V is needed for outputting the strength P3 as a light output. Accordingly, as shown in FIG. 8, when a signal of 4V is input, it is possible to change the light output strength P1 to P3 by outputting a signal of 4.5V. Regarding the feature X2, it is also possible to make the light output strength be P3 for the drive signal of 4V, by using a similar correction table. Namely, in the case of inputting 4V for the feature X2, it is possible to make the light output strength be P3 by converting the drive signal of 4V to that of 4.4V, as shown in FIG. 6.

As stated above, conventionally there has been a difference of the light output strength between the P1 and the P2 as shown in FIG. 5 in the case of inputting 4V into the liquid crystal panels of features X1 and X2. However, it is possible to obtain the light output strength P3 for both the features X1 and X2 according to this embodiment. Therefore, it is possible to make color degrees and brightness of images generated by liquid crystal panels be equal.

The reference feature S in FIG. 6 shows that the light output strength P increases in proportion to the voltage V of the drive signal. It is a role of the corrective circuit 260 to keep linear relation between the voltage V of the drive signal and the strength P of the light output. In other words, the role of the corrective circuit 260 is to change the voltage of the drive signal in order to make a feature of each liquid crystal panel be equal to the reference feature.

The correction circuit applying the ROM 261 shown in FIGS. 7 and 8 is just an example. It is also possible to correct the feature of each liquid crystal panel by using other circuit or other software.

Figure 9:
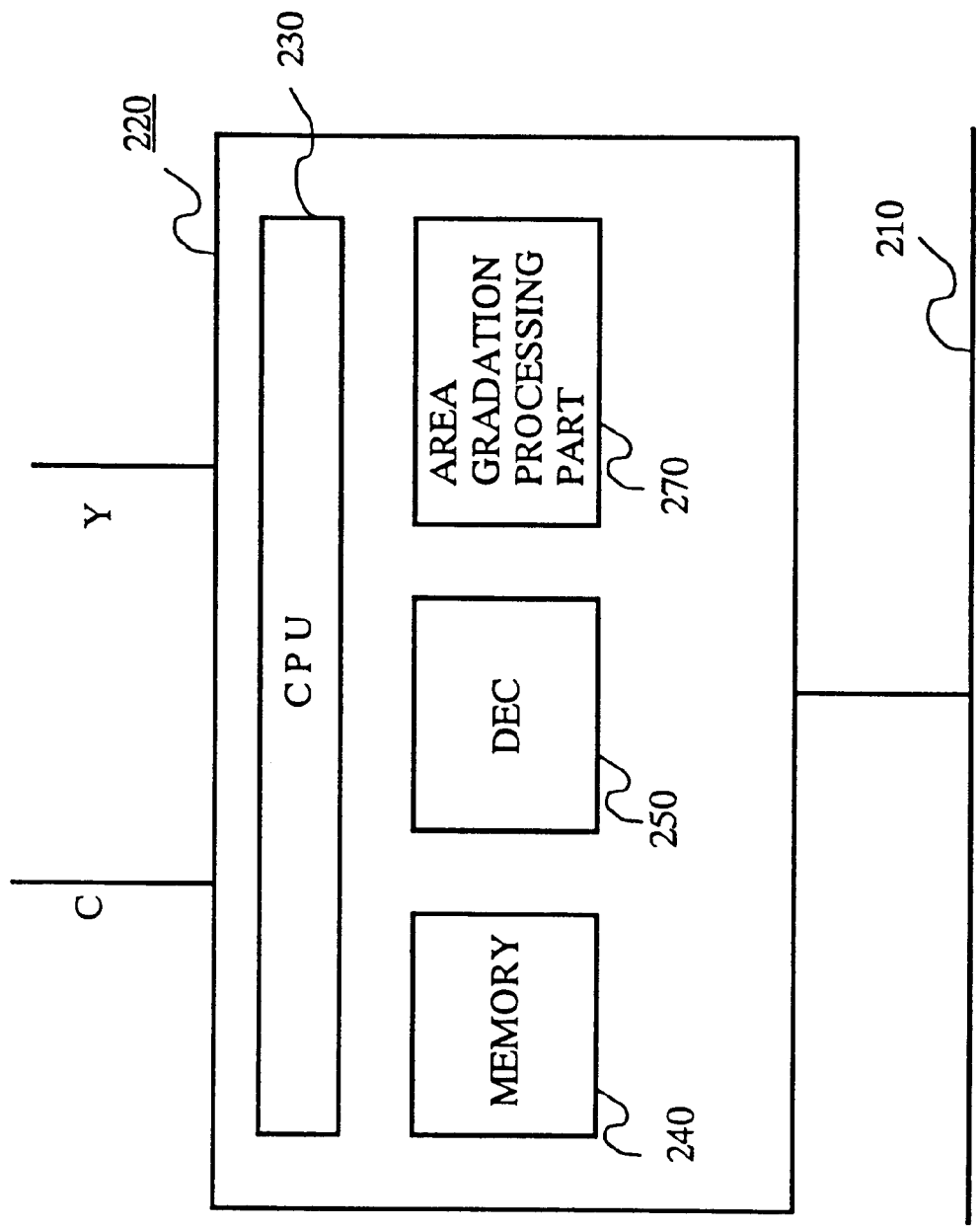
FIG. 9 shows another example of a processor part according to the present invention.

In FIG. 9, an area gradation processing part 270 is provided instead of the corrective circuit 260 in the processor part 220. When it is difficult to have equal light output strengths responsive to the voltage of the drive signal depending upon a part of features of the liquid crystal panels as shown in FIG. 5, correcting the feature of the liquid crystal panel has been necessary. However, in FIG. 5, there are some voltages of the drive signal such as 0V and 10V wherein light output strength of each feature is equal. Therefore, it becomes unnecessary to correct the voltage of the drive signal if only such voltages are used for displaying the image. Namely, even when features of the liquid crystal panels are different, it has no problem to use the panels as long as the liquid crystal panels are used at ON or OFF. The area gradation processing part 270 is for displaying the image only using the drive signals of 0V and 10V. That is, two values of ON and OFF are used for displaying the image.

Figure 10:
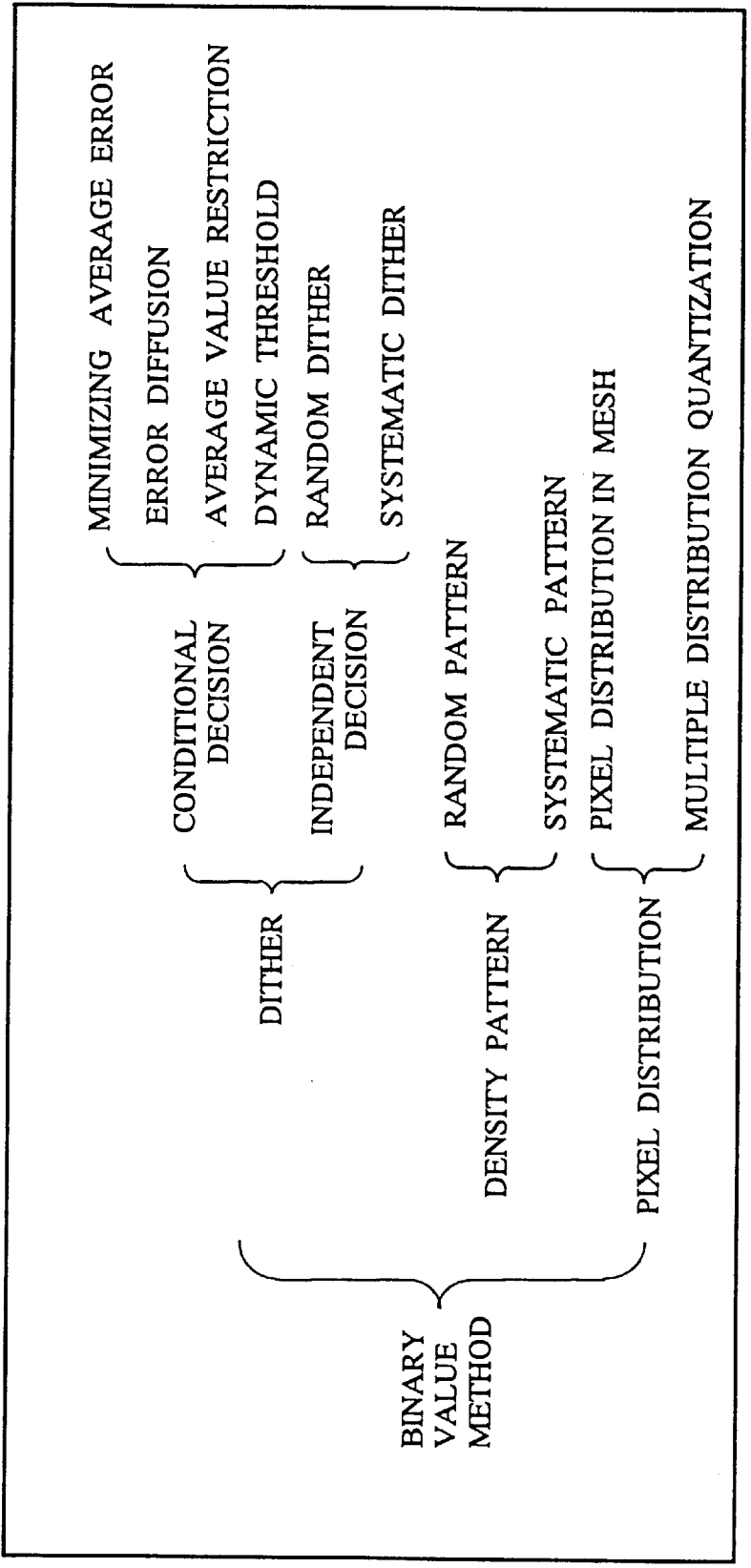
FIG. 10 shows binary value method used in an area gradation processing part of the present invention.

FIG. 10 shows various binary-value method for reproducing gradation, disclosed in the article "Imaging", Electronic Photograph Association, (Jan. 20, 1988), p.31. The area gradation processing part 270 generates an intermediate color (gradation) using the two values based on one of the binary-value method as shown in FIG. 10.

Figure 11:
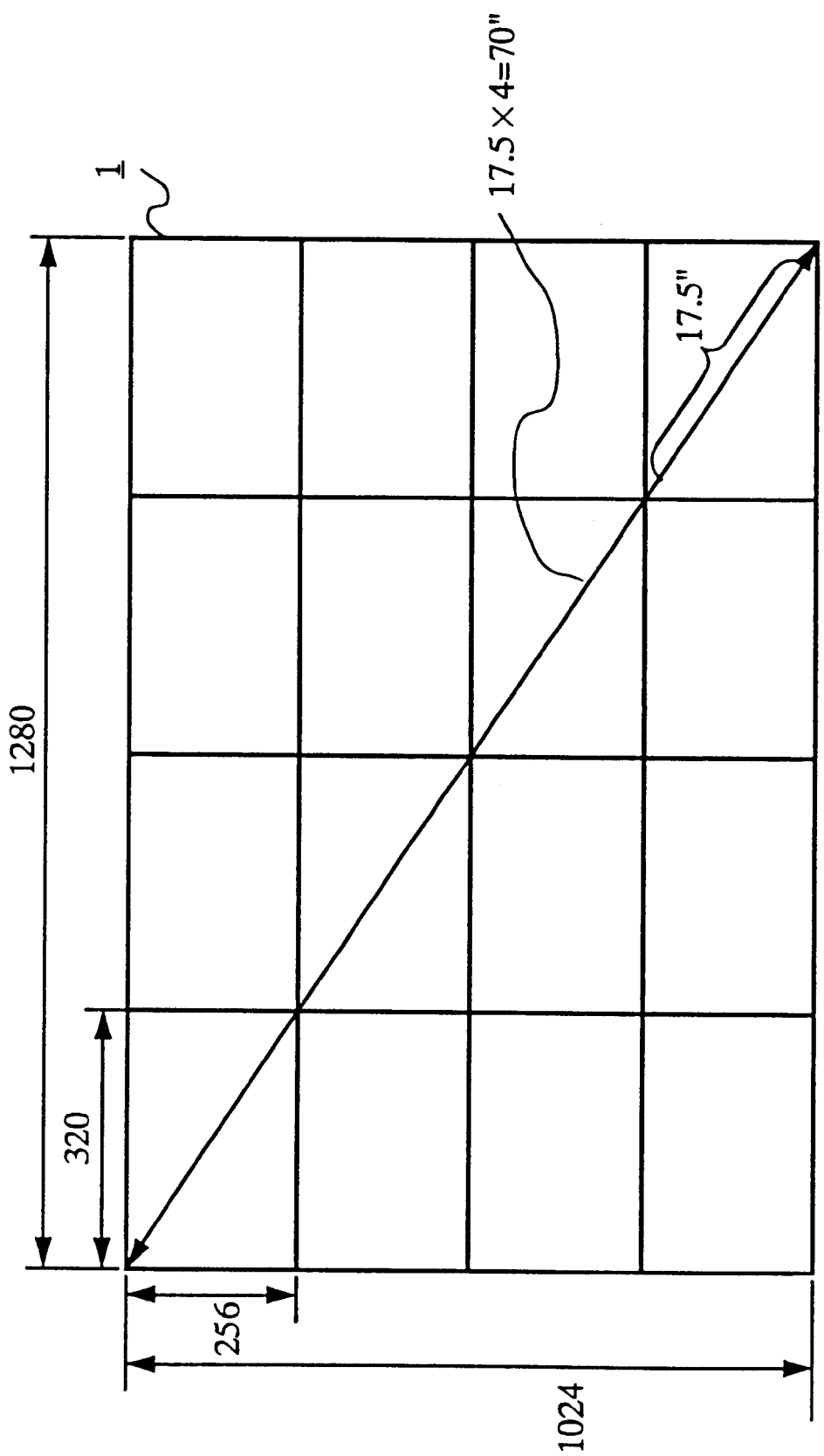
FIG. 11 shows a concrete example of an area gradation processing part according to the present invention.

FIG. 11 shows an example of the image display system having an array of 4×4. In the case of one screen consisting of 1024×1280 dots, a partial image consists of 256×320 dots. Size of the partial image is 17.5 inches and that of the whole image is 17.5×4=70 inches. When the partial image of 256×320=81,920 dots is displayed by applying a liquid crystal panel of 0.7 inches, totally 81,920×16=1,310,720 dots can be displayed. In the case of displaying an image of 640×320 dots by using the above number of pixels (1,310,720), it becomes 1,310,720/(640×320)=6.4, so that about 6 dots is suitable for displaying one pixel. The case 4×4 has been explained in this example. If size of the array becomes larger, the number of dots for one pixel can be increased. Therefore, a higher gradation processing, such as sixteen gradation or thirty-two gradation, can be performed.

Figure 12:
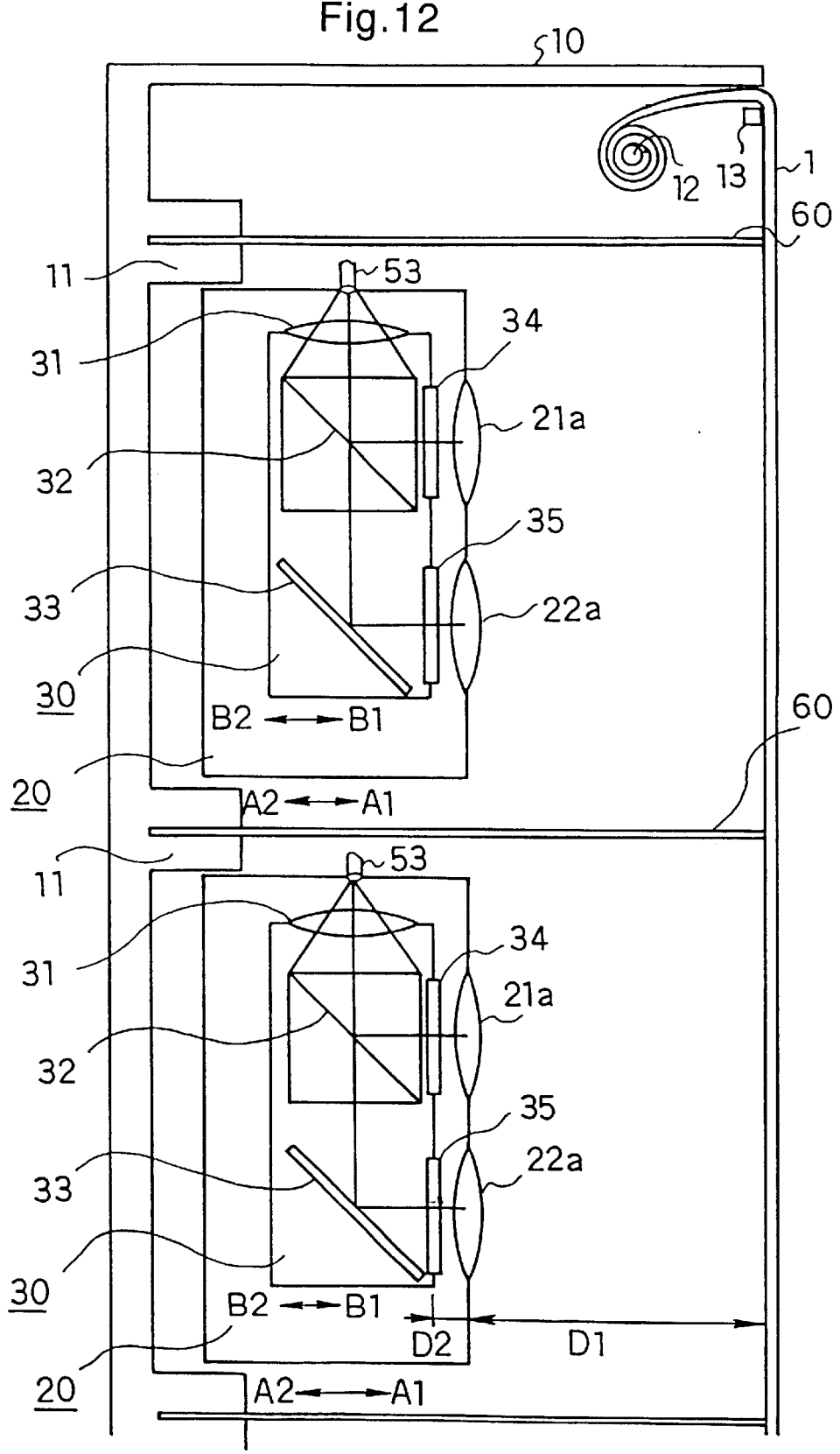
FIG. 12 shows fixing of a liquid crystal module according to the present invention.

FIG. 12 shows another example of the image display system of the present invention. Difference between the configuration of FIG. 12 and that of FIG. 2 is that projections lenses 21*a* and 22*a* having different focal length are used instead of the projection lenses 21 and 22. When the focal length of the projection lens is changed, a distance D1 between the projection lens and the screen 1 and a distance D2 between the projection lens and the liquid crystal panel should be changed Therefore, the liquid crystal module 20 is installed at a fixing part 11 to be slided along the arrows A1 and A2. The optical module 30 is installed at the liquid crystal module 20 to be slided along the arrows B1 and B2.

Since the liquid crystal module 20 and the optical module 30 are installed to be slided, this image display system 100 can flexibly deal with the case even when the projection lens is exchanged.

Structure of installing the liquid crystal module 20 and the optical module 30 to be slided can be performed by well-known slide structure not shown in FIG. 12. Position arrangement using the slide can be performed at the front side of the image display system 100 if the screen 1 is wound up and the light shielding board 60 is detached.

As stated above, the light shielding board 60 is detachably installed at the fixing part 11. It is easy to perform the stated installation or maintenance of the liquid crystal module 20 and the optical module 30, if the light shielding board 60 is detached. It is also easy to exchange the light shielding board 60 when the board itself is damaged.

Figure 13:
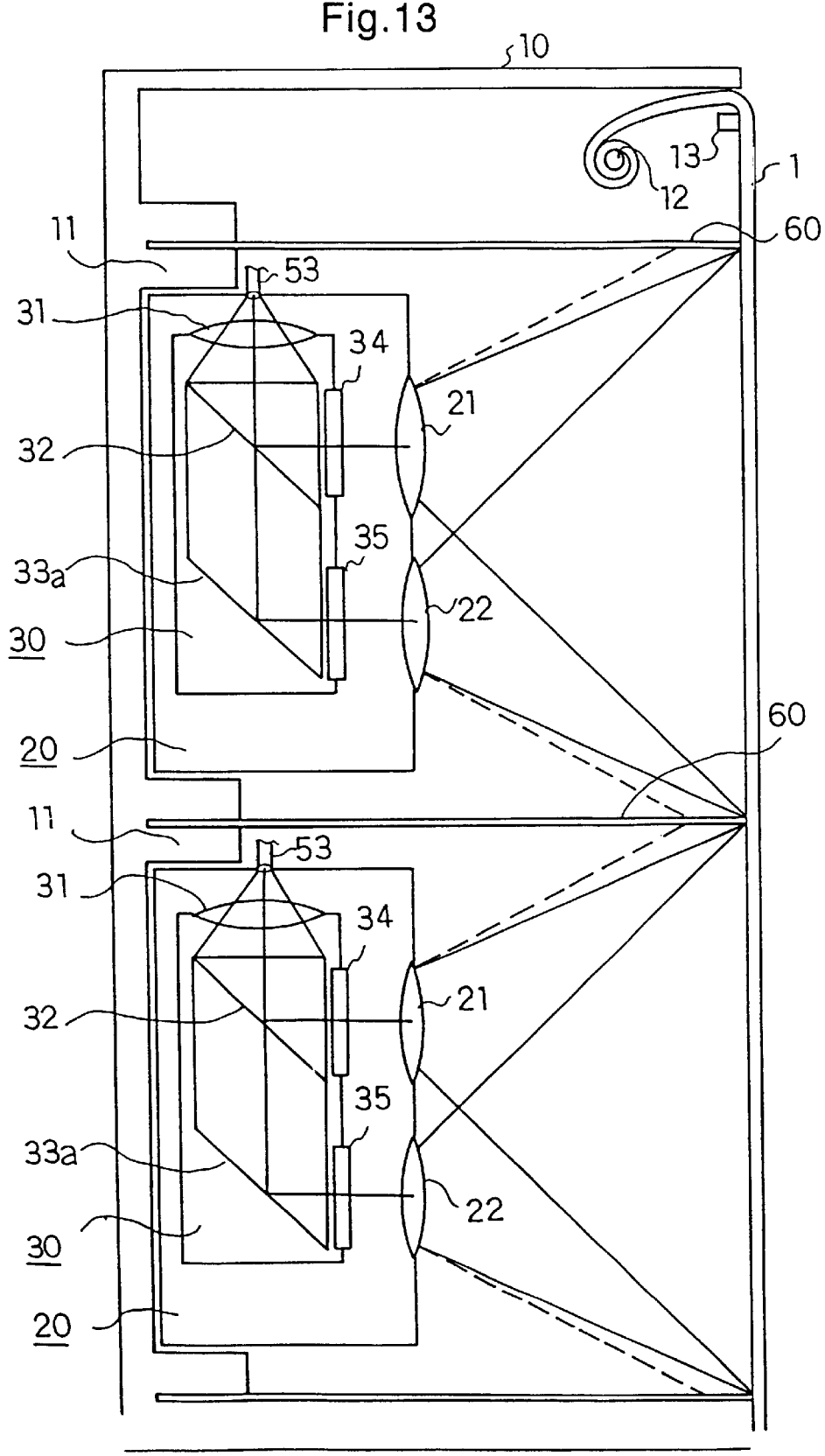
FIG. 13 shows another example of a liquid crystal module according to the present invention.

FIG. 13 shows another example of the liquid crystal module 20. Difference between the liquid crystal module 20 of FIG. 13 and that of FIG. 2 is that a total reflecting board 33*a* is used instead of the reflective mirror 33. In the case of using the reflective mirror 33 of FIG. 2, light loss is generated by the reflective mirror 33. However, as the total reflecting board 33*a* of FIG. 13 is a reflective board utilizing refractive index, the board 33*a* totally reflects input light, so that light loss by the reflection is not generated. The total reflecting board 33*a* and the polarization beam splitter 32 compose one body. It is easy to make the total reflecting board 33*a* and the splitter 32 be module by molding them at both sides of a material whose refractive index is n.

Figure 14A:
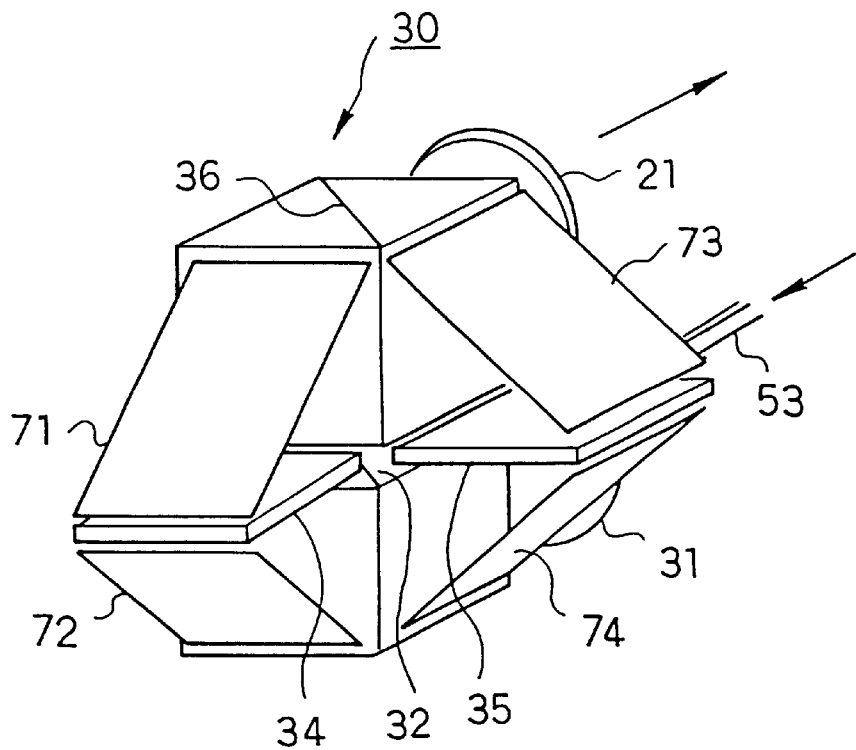
FIG. 14A shows another example of a liquid crystal module according to the present invention.
Figure 14B:
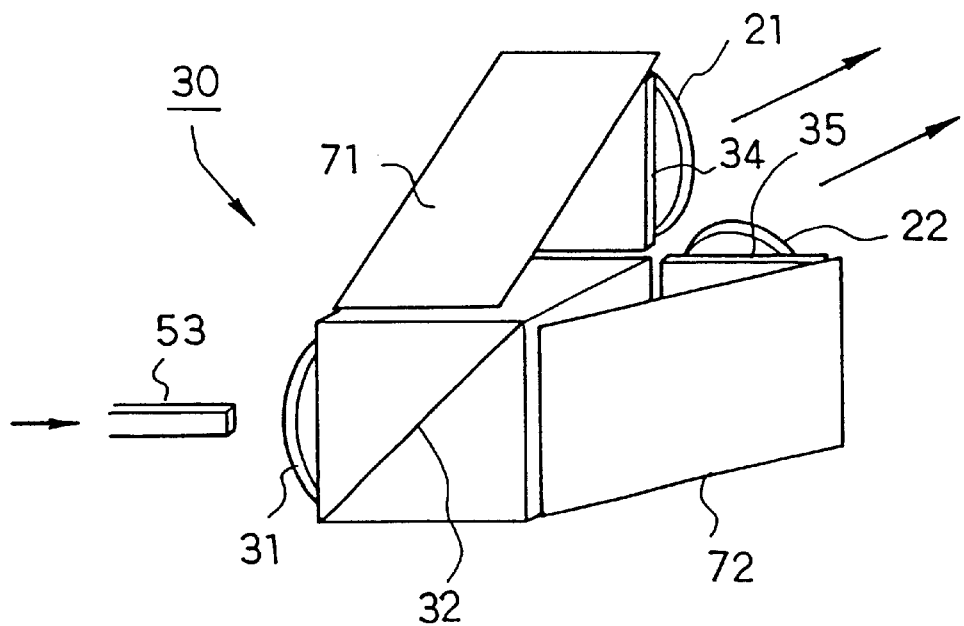
FIG. 14B shows another example of a liquid crystal module according to the present invention.

FIGS. 14A and 14B show another example of the liquid crystal module 20. In FIG. 14A, two polarization beam splitters 32 and 36 are used. Reflective mirrors 71 through 74 are for making optical paths. The polarization beam splitter 36 synthesizes two images from the liquid crystal panels 34 and 35. Therefore, only one projection lens is needed. In FIG. 14B, the liquid crystal panels 34 and 35 are vertically installed with respect to the polarization beam splitter 32.

It is acceptable not only there existing two liquid crystal panels for color and luminance in the liquid crystal module but also existing only one liquid crystal panel for color or three liquid crystal panels for colors of R, G and B (red, green and blue). It is also acceptable there being four liquid crystal panels for colors of R, G, B and Y (luminance).

Figure 15:
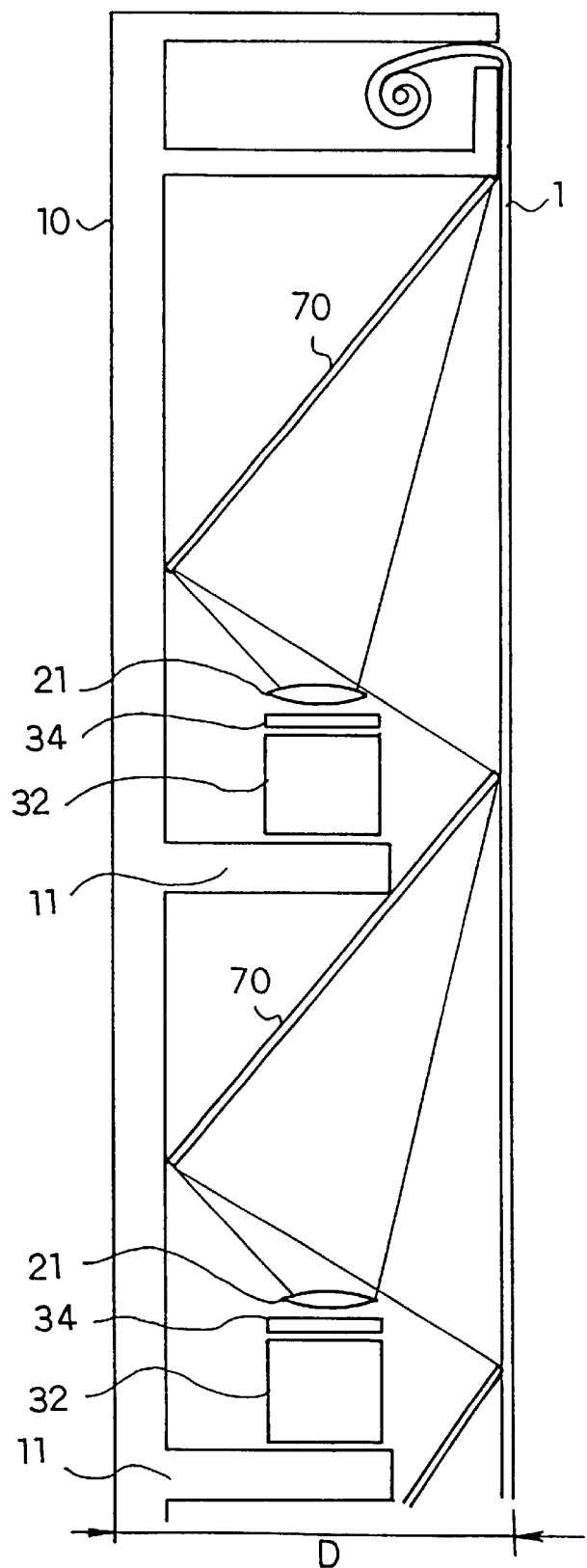
FIG. 15 shows an image display system applying a reflective mirror according to the present invention.

FIG. 15 shows one example of the image display system applying a reflective mirror 70. A projected light from the projection lens 21 is reflected at the reflective mirror 70 and projected onto the back of the screen. Since there existing the reflective mirror 70, it becomes possible to further shorten the depth D of the image display system. In addition, the light shielding board 60 can be omitted because the reflective mirror 70 itself is able to shield light from other liquid crystal module. In this case, however, only the light shielding boards horizontally placed can be omitted and those vertically placed are still necessary.

Figure 16:
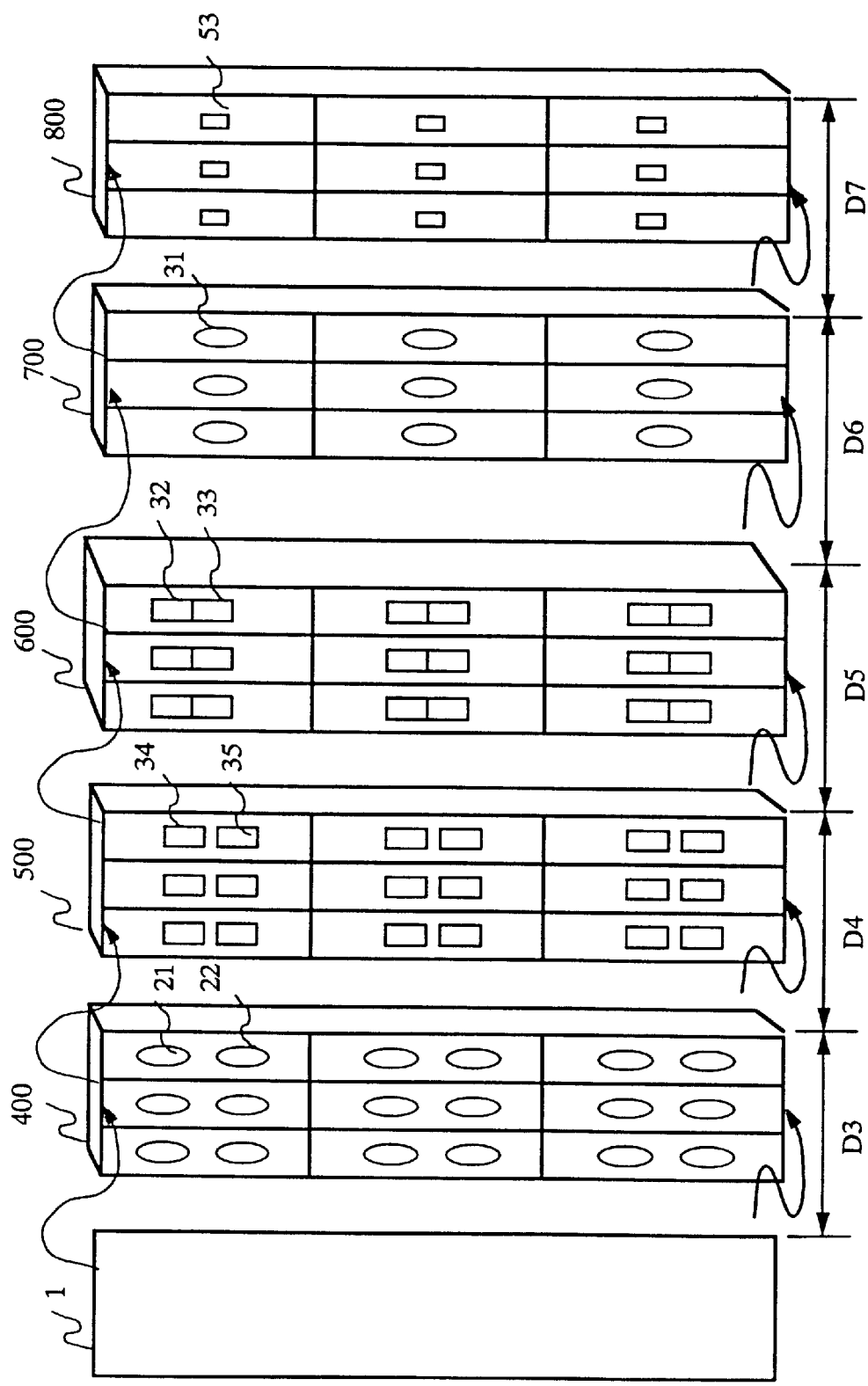
FIG. 16 shows an image display system applying an array board according to the present invention.

FIG. 16 shows another example of the image display system of the present invention. In FIGS. 1 and 2, the liquid crystal modules respectively exist per partial image. In FIG. 16, the image display system is composed by arraying components such as the projection lenses and the liquid crystal panels on an array board based on their kinds. The projection lenses 21 and 22 are arrayed on an array board 400 for projection lens. Similarly, the liquid crystal panels 34 and 35 are on an array board 500 for liquid crystal panel, the polarization beam splitter 32 and the reflective mirror 33 on an array board 600, the lens 31 on an array board 700 for lens, and the optical fiber cable 53 on an array board 800 for optical fiber cable.

Figure 17:
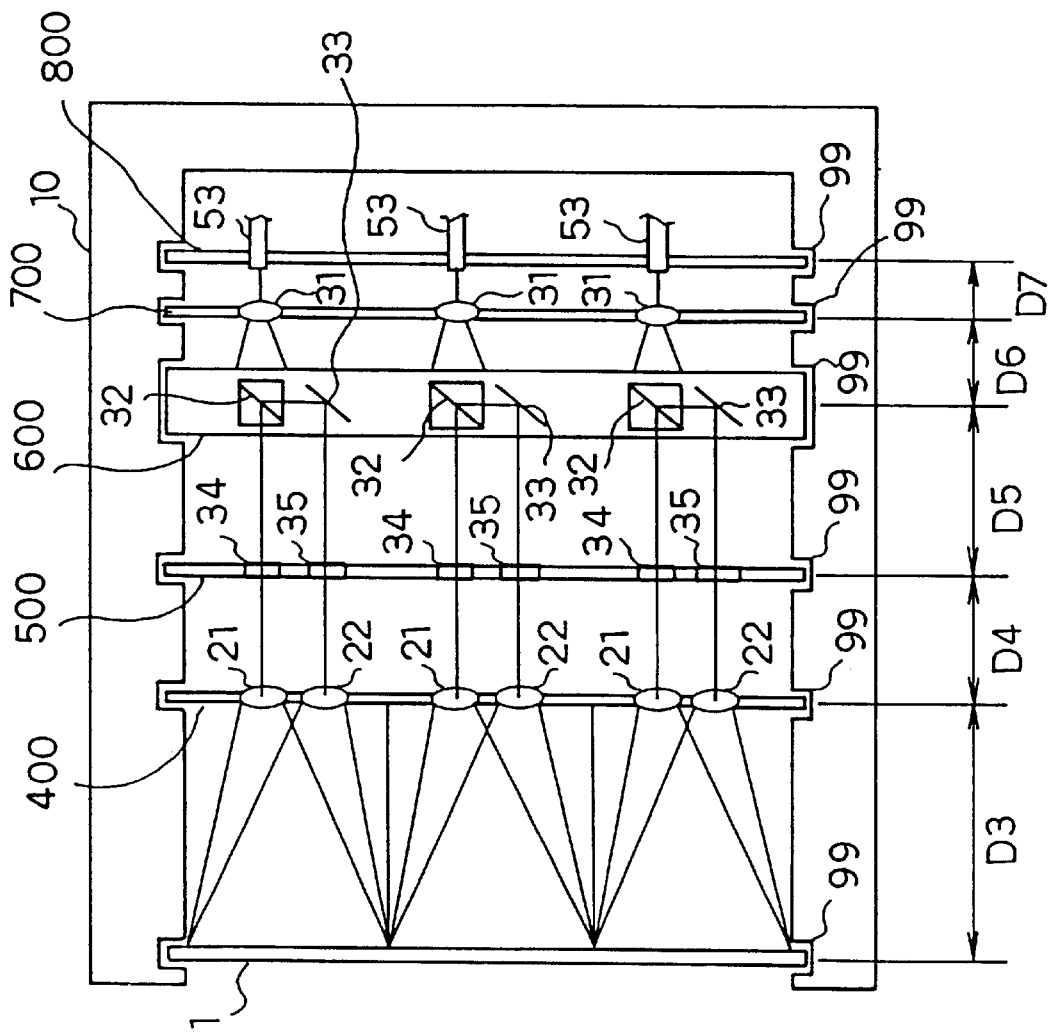
FIG. 17 shows an image display system applying an array board according to the present invention.

These array boards are arranged on the cabinet 10 of FIG. 17 with keeping a specific space each other. Maintenance of the array boards 400 through 800 can be performed by opening a side panel (not shown) of the cabinet 10, sliding them along grooves 99 and taking them out.

Figure 18:
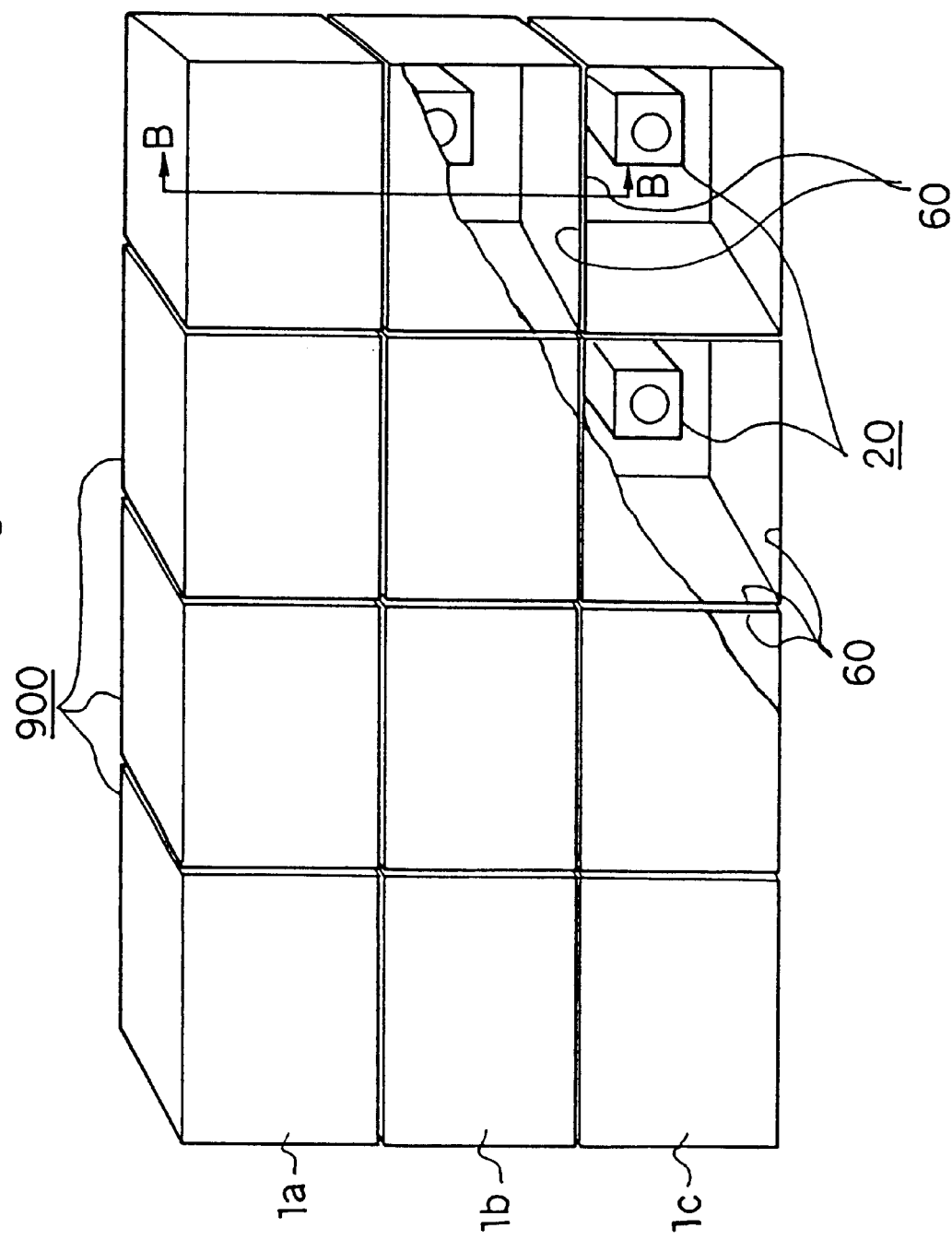
FIG. 18 shows an image display system applying modules according to the present invention.

FIG. 18 shows another example of the image display system of the present invention. The case of the screen consisting of one panel has been explained in the foregoing example. In this example, the case of the screen itself being partially divided is shown.

It is possible to make the image display system be module by dividing the screen into partial screens 1a, 1b, 1c, ... The case of FIG. 18 is composed of twelve (3×4=12) modules 900.

Figure 19:
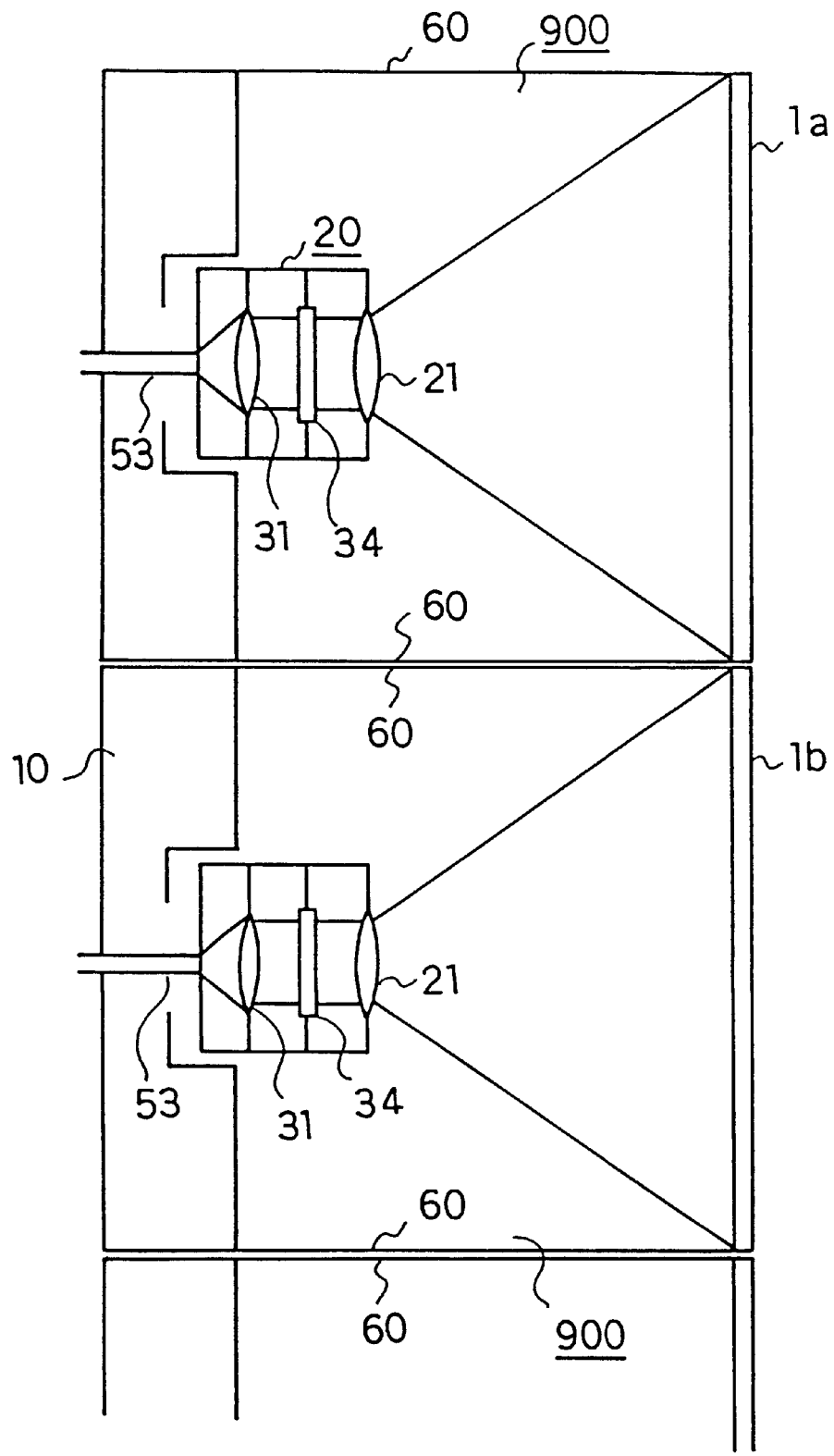
FIG. 19 shows a side sectional view of a module according to the present invention.

FIG. 19 shows a sectional view at the line B—B in the module of FIG. 18. Each module 900 can be separated from other modules. It is possible to operate the module 900 as a part of the screen by connecting the module 900 to the optical fiber cable 53 and the bus 210 (not shown). As stated above, the processor part 220 (not shown) is provided in the module 900. When the controller 300 designates a partial image to be displayed for the processor part 220 via the bus 210, each module 900 can display the designated partial image.

Figure 20A:
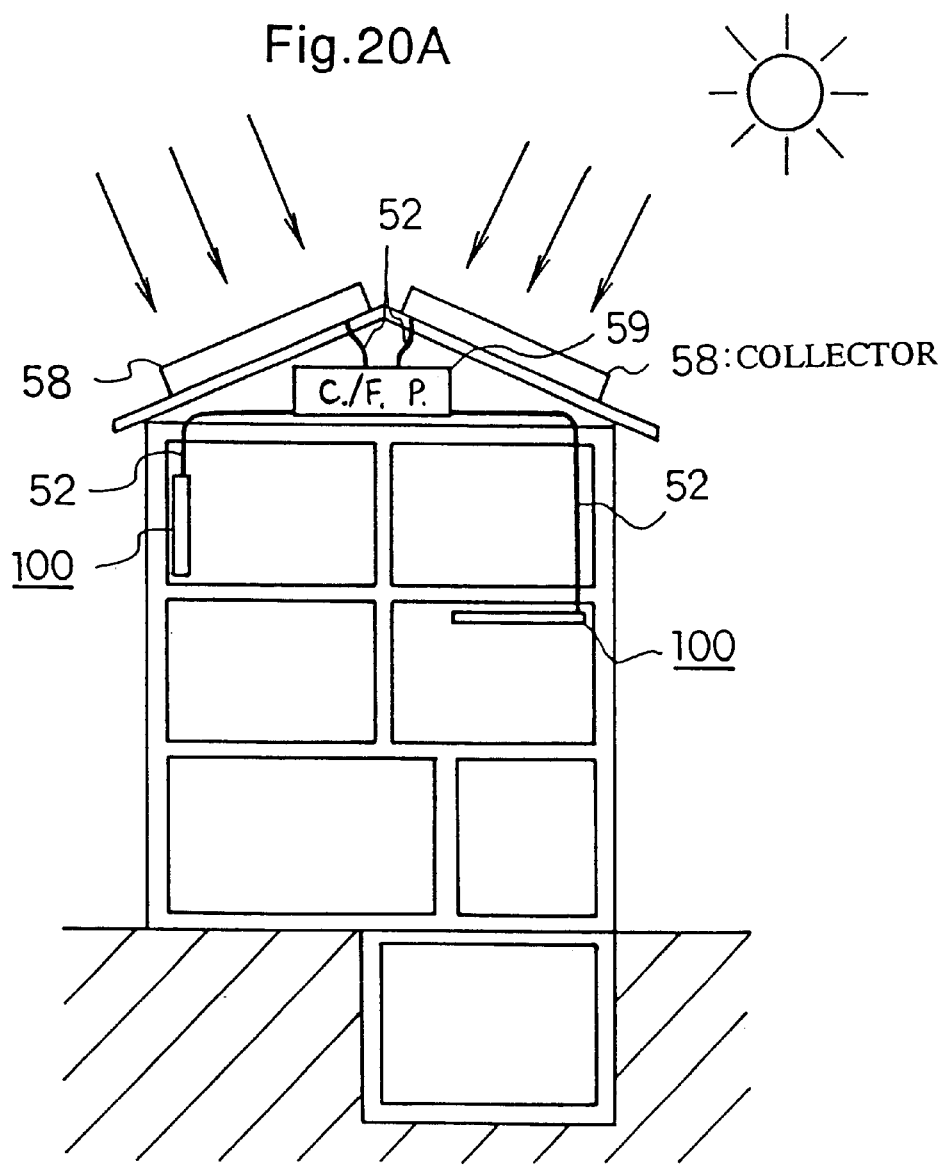
FIG. 20A shows an image display system applying a collector according to the present invention.
Figure 20B:
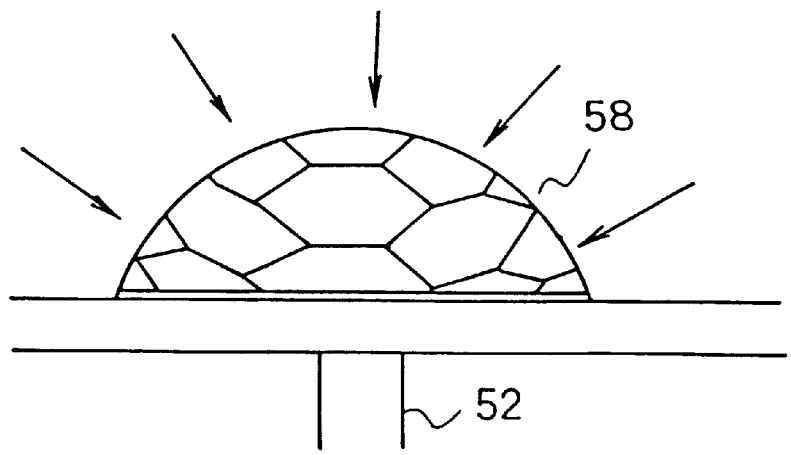
FIG. 20B shows an image display system applying a collector according to the present invention.

FIGS. 20A and 20B show another example of the light source of the present invention. In the above examples, utilizing light radiated from the light source 50 has been explained. In FIGS. 20A and 20B, natural light (sunshine) is collected by a collector 58, and a collect/forward part 59 supplies the light to the image display system 100 arranged in each room. Since the natural light is used, the collected light is parallel, which makes the image be clearer. The collector 58 in FIG. 20A is made of flat plate, whereas that in FIG. 20B is of sphere. A lens which collects natural light and outputs the light to the cable-bundle 52 is arranged in each hexagon part.

As the system of FIGS. 20A and 20B can not be used at night, it is necessary to provide the light source 50 as shown in FIG. 1 inside the image display system 100. Therefore, a switch for switching from the collector 58 to the light source 50 is needed. It is also acceptable to provide a synthesizer, instead of the switch, for synthesizing light from the collector 58 and light from the light source 50.

FIG. 21 illustrates an application example of the image display system consisting of the modules 900 as shown in FIG. 18. Plural modules 900 are arranged on the ceiling and the wall in FIG. 21. A flexible screen can be composed by suitably arraying the modules 900 corresponding to the size of the ceiling or the wall. In addition, it is possible to display a virtual window or a virtual sky by having the screen on the ceiling or the wall, as shown in FIG. 21. For instance, if the screen installed on the wall displays a seaside and the screen on the ceiling displays a blue sky in summer, a person who sees the screen can feel as if he were in a house by the seaside.

Furthermore, it is also acceptable to radiate light without displaying an image. Since the liquid crystal panel has a function of controlling amount of transmitted light by using the drive signal, the panel can be used as an illuminator when only light radiated from the light source, without image, is displayed on the screen by using an adjustment system (not shown). When the panel is used as the illuminator, it is also acceptable to detach the screen. When natural light is collected by the collector 58 as stated with reference to FIG. 20, it is possible to obtain the natural light into a room.

As stated above, a fiber of quartz or a fiber of plastic can be used as the fiber 54 composing the cable-bundle 52, and ultraviolet rays can be blocked out by using the fiber of plastic. Therefore, when light from the light source or natural light is radiated into a room, safe light without the ultraviolet rays can be supplied by using the fiber of plastic.

Figure 22:
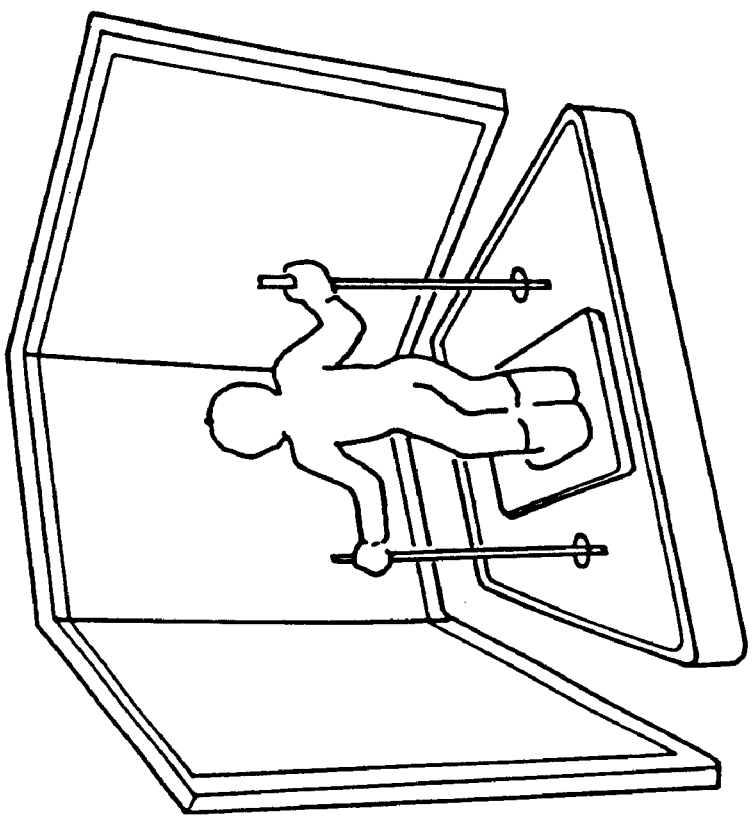
FIG. 22 shows a folding type screen of the present invention.

FIG. 22 shows another application example. The display screen can be folded like a letter U in FIG. 22. When the screen is folded, it can be easily carried and space for storing it can be small. A powerful image can be obtained if a part of the screen is located close to a viewer.

Figure 23:
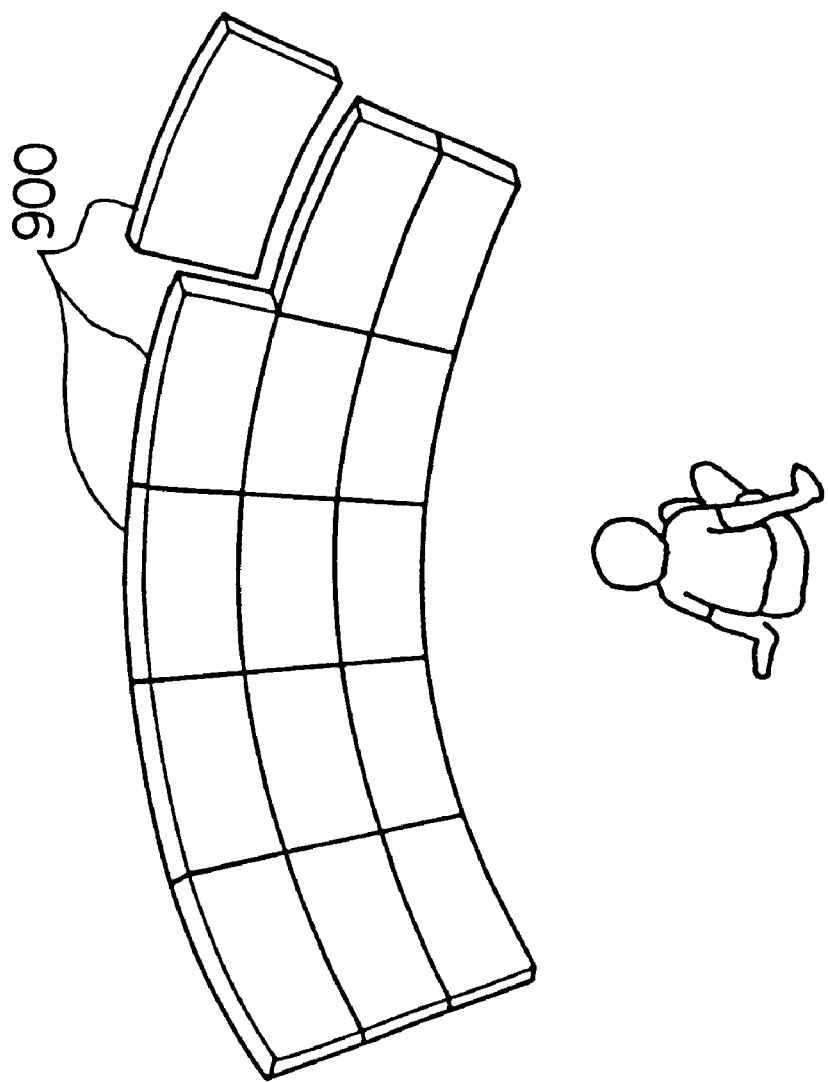
FIG. 23 shows an incurved screen of the present invention.

FIG. 23 shows the case that the modules 900 are curved inside, which makes it possible for the viewer to be provided a wide screen at the maximum visual angle.

Figure 24:
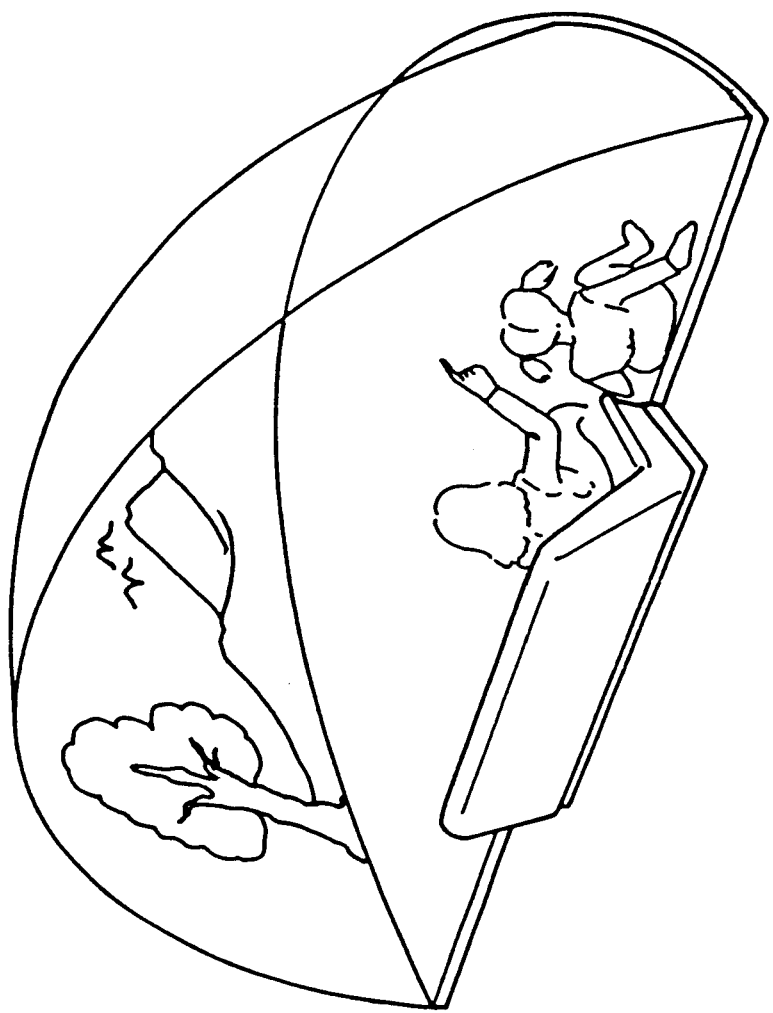
FIG. 24 shows a domed type screen of the present invention.
Figure 25:
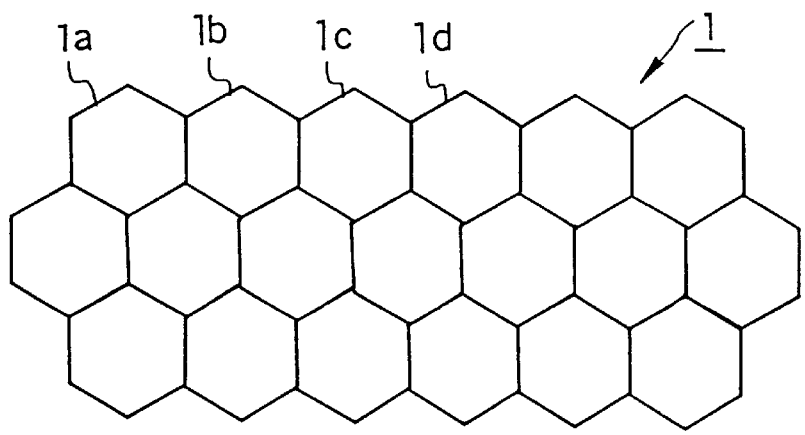
FIG. 25 shows partial screens of a domed type screen according to the present invention.
Figure 26:
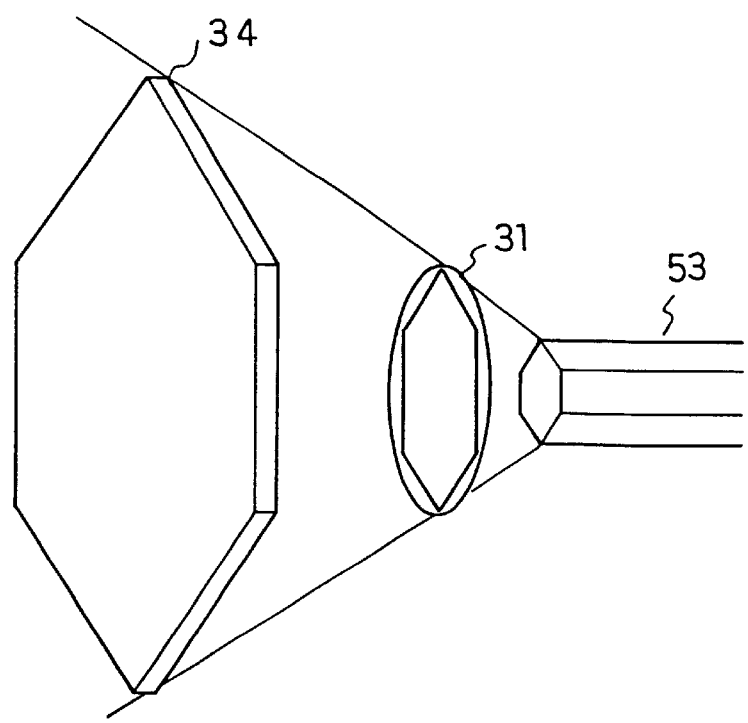
FIG. 26 shows a configuration of a liquid crystal module used for a domed type screen according to the present invention.

The screen in FIG. 24 is a domed type. FIGS. 25 and 26 show modules for composing the domed screen. It is desirable for partial screens 1a, 1b, 1c, 1d, ... composing the domed screen to be hexagon. In other words, it becomes easy to compose the domed screen by using the hexagon. FIG. 26 shows the liquid crystal module in the case of a partial image being hexagon. As the partial image is hexagon, the liquid crystal panel 34 and a sectional shape of the optical fiber cable 53 are also hexagon. Since the shapes of the liquid crystal panel and the optical fiber cable correspond with that of the screen, an image generation without any light loss in light utilization efficiency can be performed.

According to the present invention, as stated above, one image is composed of plural partial images, and each partial image is generated by each liquid crystal module. Therefore, it becomes unnecessary to use the Fresnel lens or the lenticular plate, which is applied for increasing the center gain with respect to lateral direction, in the conventional liquid crystal projection television wherein a large image is generated by one liquid crystal panel. The Fresnel lens and the lenticular plate are provided for correcting unbalance between visual features at the center of large image and circumferential part of it. Size of modular partial image according to the present invention is 10 through 20 inches, for instance. When an image is displayed on such sized partial screen using the liquid crystal panel, the above Fresnel lens and lenticular plate are not necessary, which reduces the cost of the screen. In this example, a detachable panel including a diffusing material is appropriate as the screen.

The case that one light source supplies light to all the liquid crystal modules inside the system has been explained in the above example. However, it is also acceptable to provide plural light sources 50 in one system, namely plural light sources supply light to plural liquid crystal modules. For instance, supposing that two light sources and eight liquid crystal modules exist, light can be supplied from the two light sources to eight liquid crystal modules, or from each liquid crystal module to four liquid crystal modules. An outstanding feature of the present invention is that at least one light source supplies light to plural liquid crystal modules.

Figure 27:
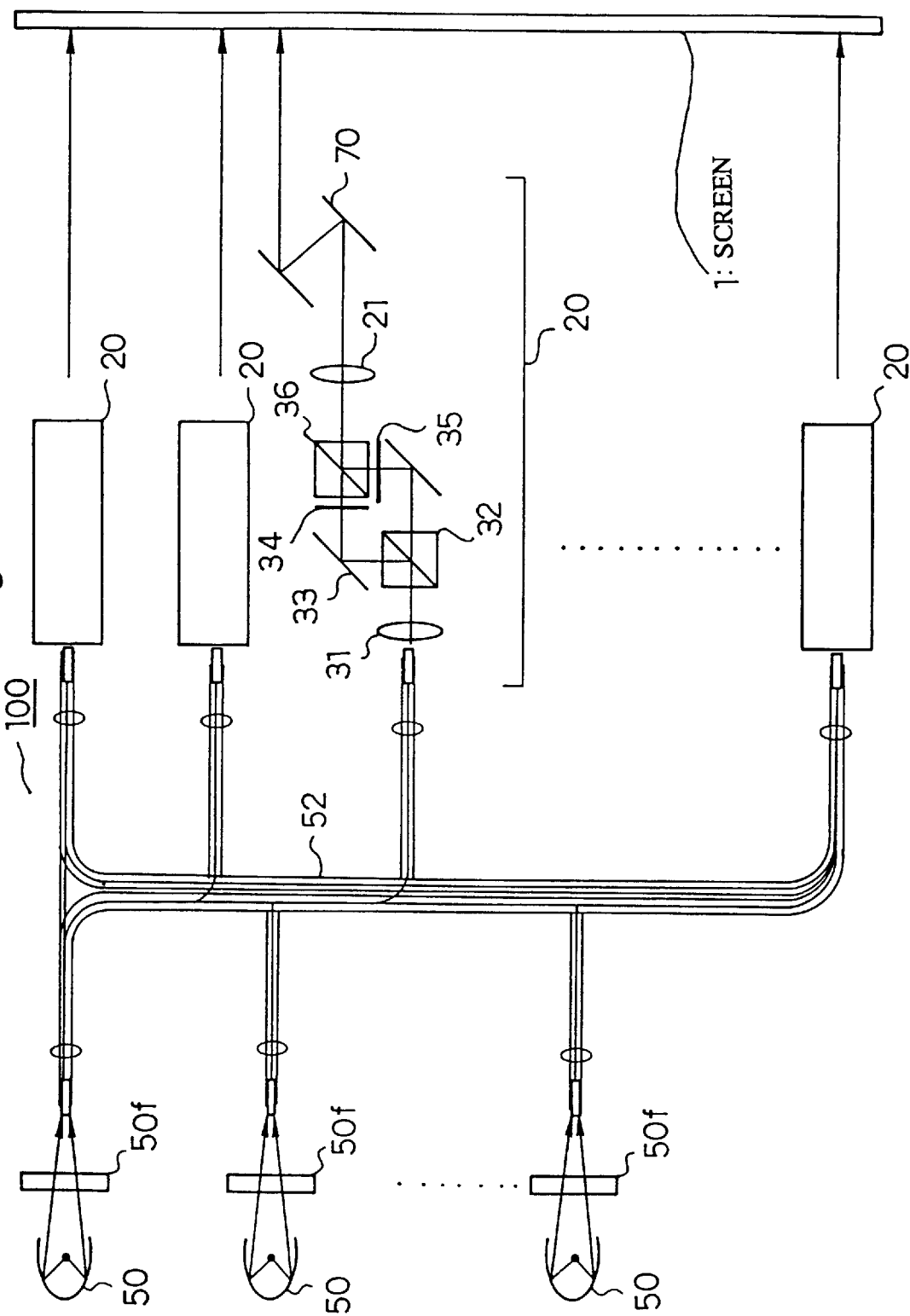
FIG. 27 shows an image display system applying plural light sources according to the present invention.
Figure 28:
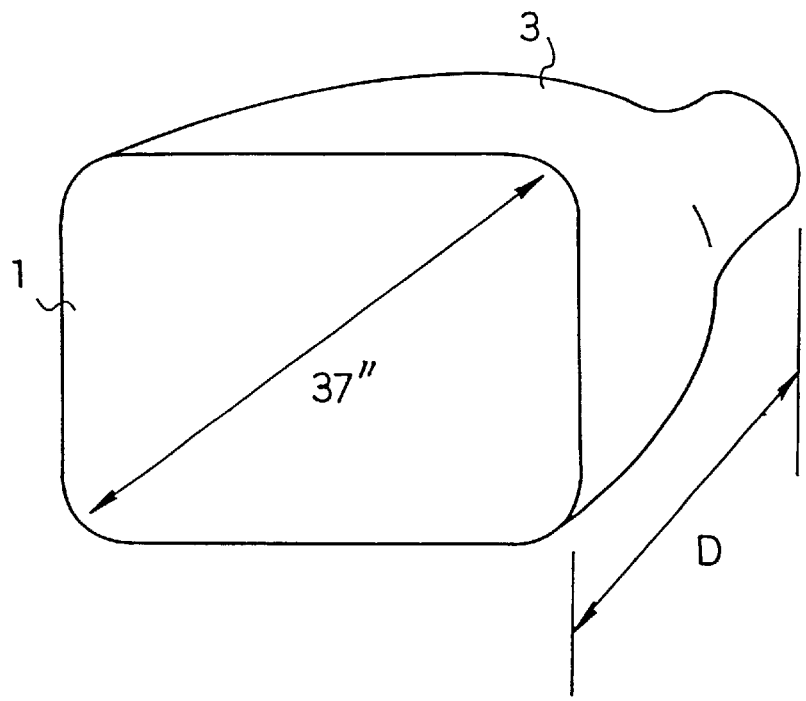
FIG. 28 shows a conventional image display apparatus applying a CRT.
Figure 29:
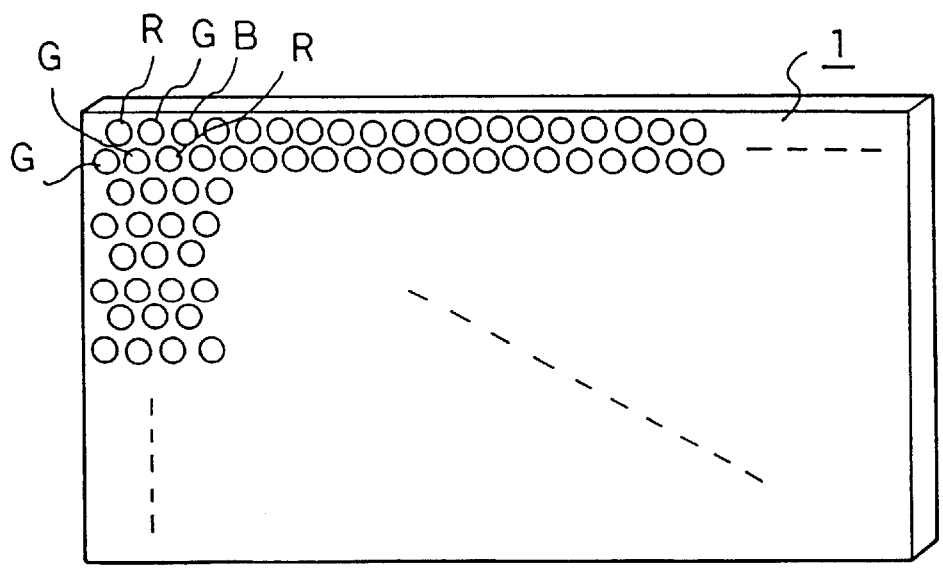
FIG. 29 shows a conventional image display apparatus applying fluorescent-character-display-tubes.
Figure 30:
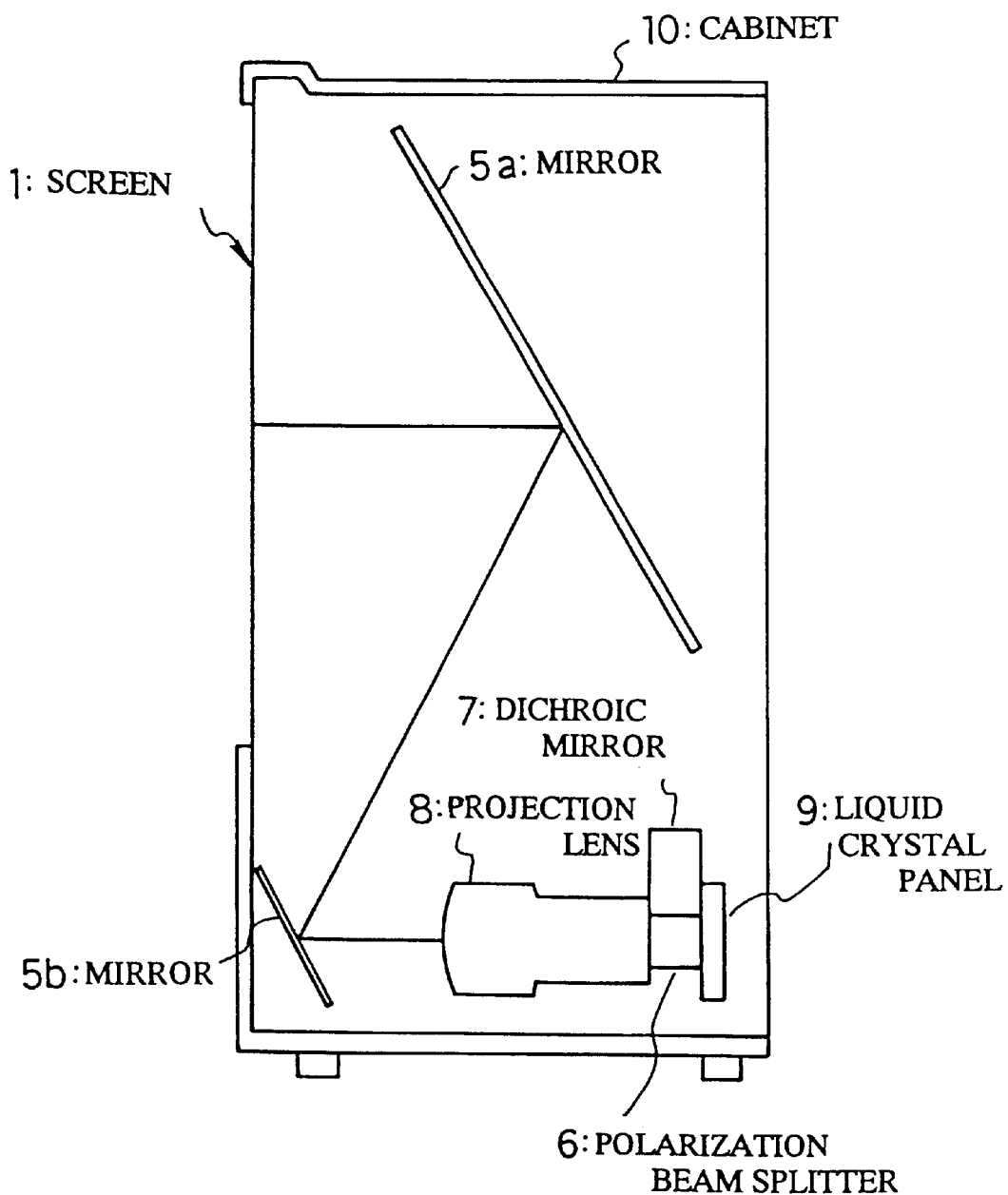
FIG. 30 shows a conventional projection television.
Figure 31:
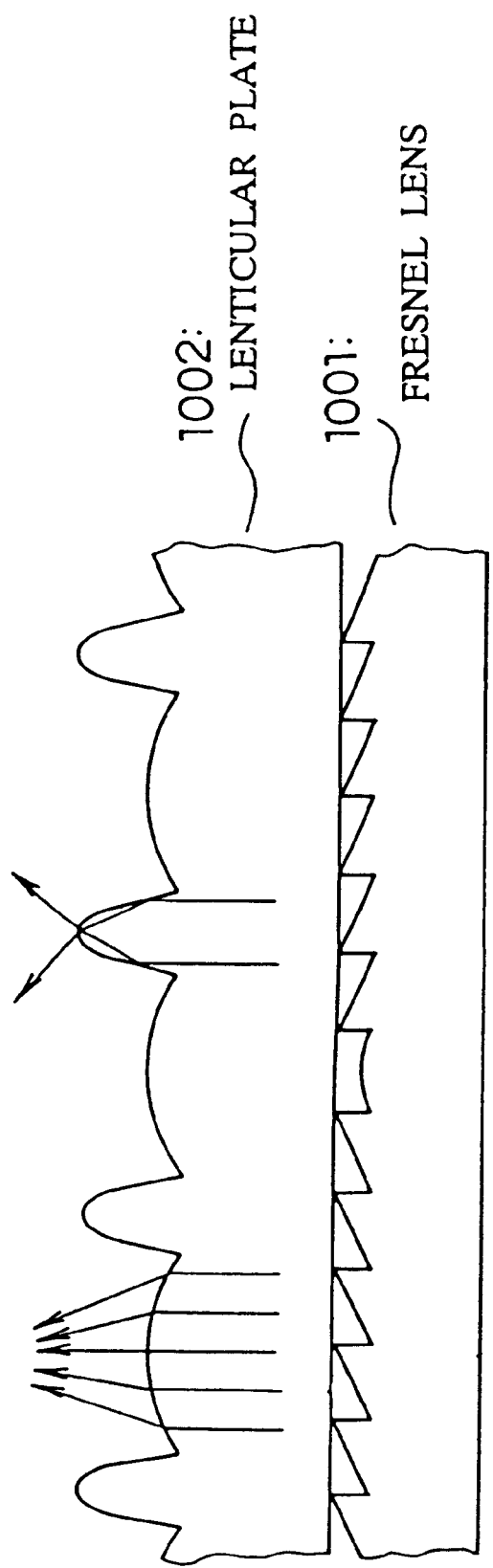
FIG. 31 shows a conventional screen.
Figure 32:
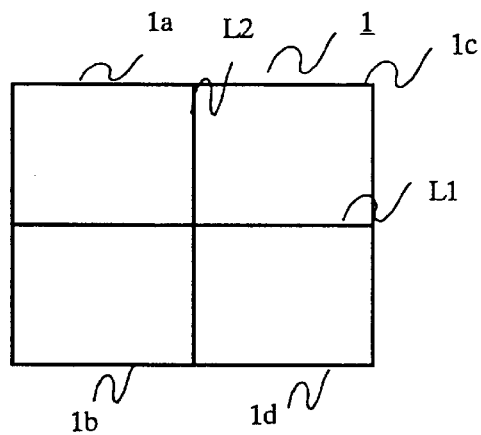
FIG. 32 shows a conventional screen division.
Figure 33:
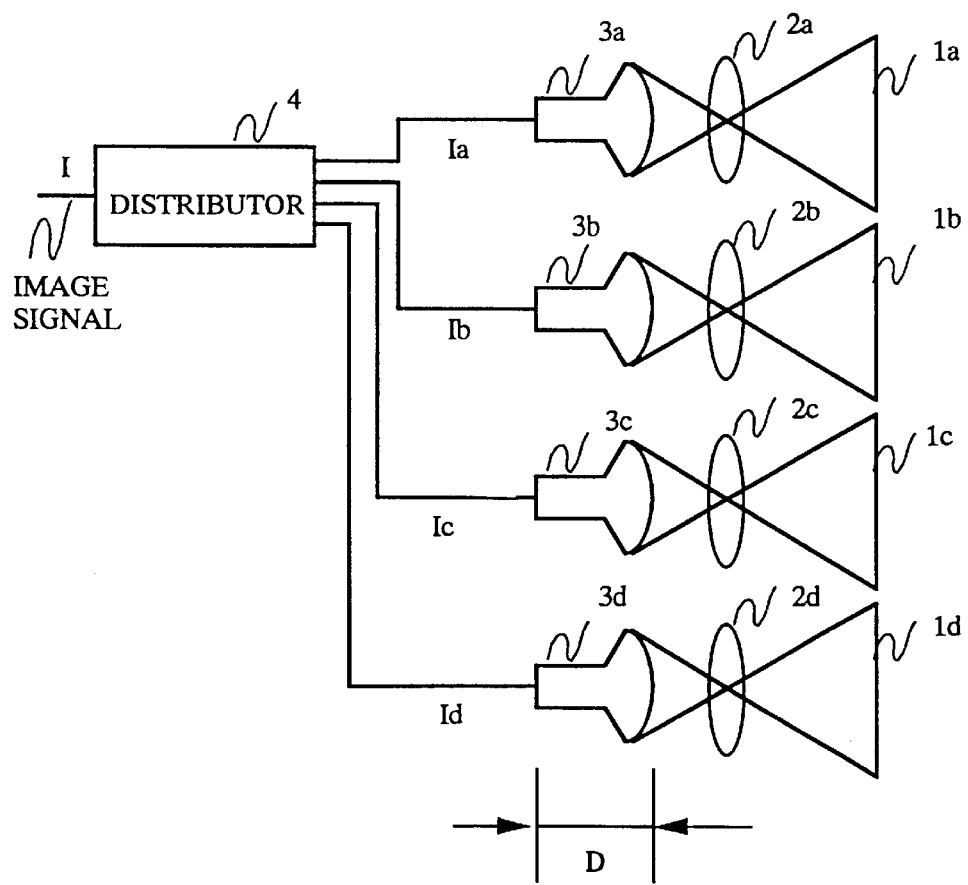
FIG. 33 shows a conventional image display apparatus applying a CRT.

FIG. 27 shows a configuration of the image display system wherein plural light sources and plural liquid crystal modules are provided. In FIG. 27, ultraviolet rays/infrared rays shielding filters 50f are installed. Light from each light source 50 is separated and supplied to plural liquid crystal modules. Since plural light sources are installed, enough light for realizing a clear image can be supplied even when a large-scale image display system is composed of plural liquid crystal modules.

Figure 34:
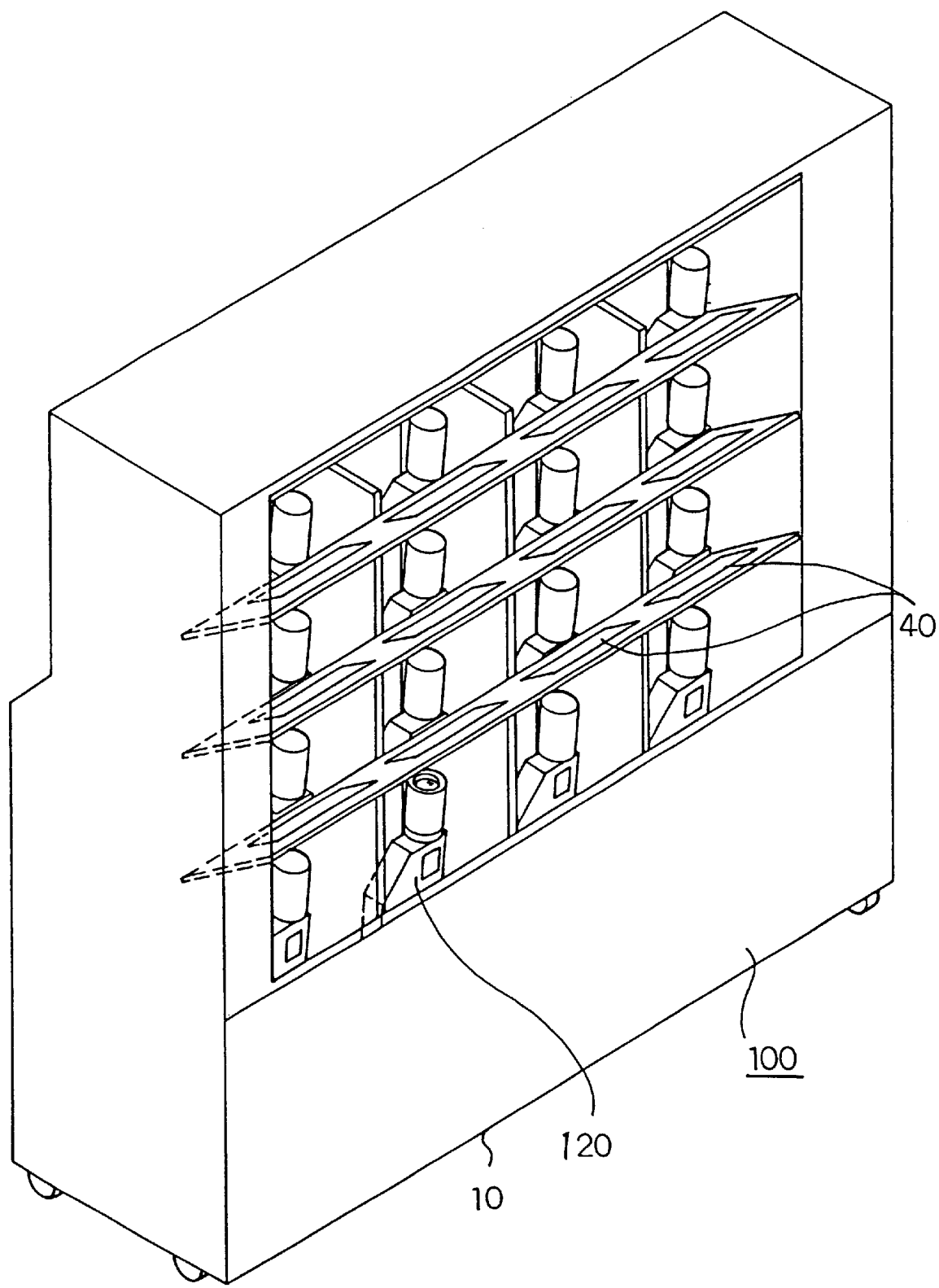
FIG. 34 shows a front perspective view of one example of an image display system according to the present invention.
Figure 35:
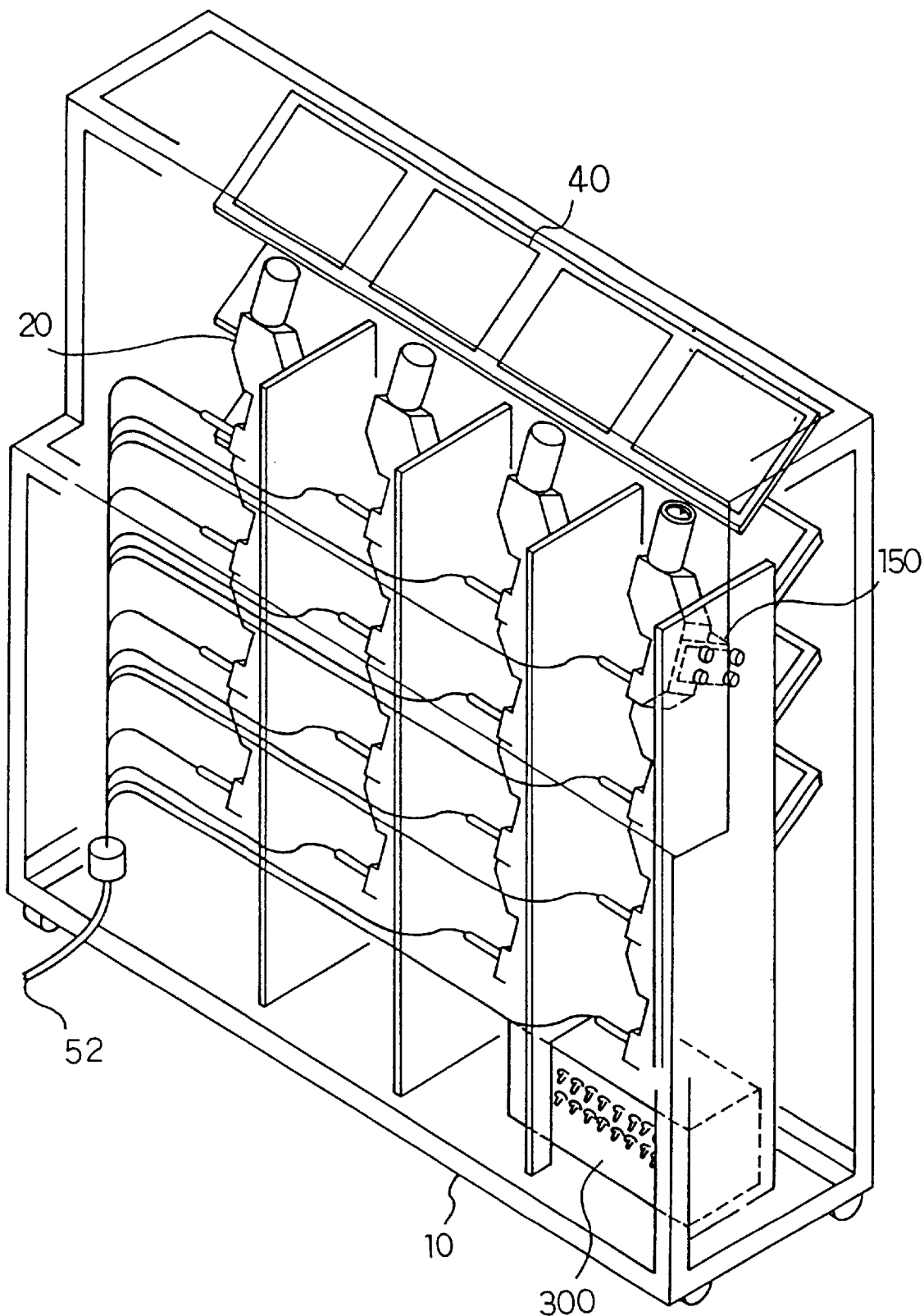
FIG. 35 shows a rear perspective view of one example of an image display system according to the present invention.

FIG. 34 illustrates a perspective view showing a front side of another image display system according to the present invention. FIG. 35 illustrates a perspective view showing a back side of it. The screen 1 has been detached in FIGS. 34 and 35 for showing the inside configuration. When an image is actually displayed, the screen 1 covers all the front side of the image display system 100. In FIGS. 34 and 35, projection units 120 are arrayed at 4×4 and installed at the cabinet 10 through an adjustment system, such as an adjustment stage 150. The projection unit 120 inputs an image signal from the controller 300, and then an image from the projection unit 120 is projected onto the screen 1 from the back of it through a reflective mirror 40. In this case, light is supplied from the light source installed at a lamp box (not shown) to the projection unit 120 through the optical fiber cable-bundle 52.

Figure 36:
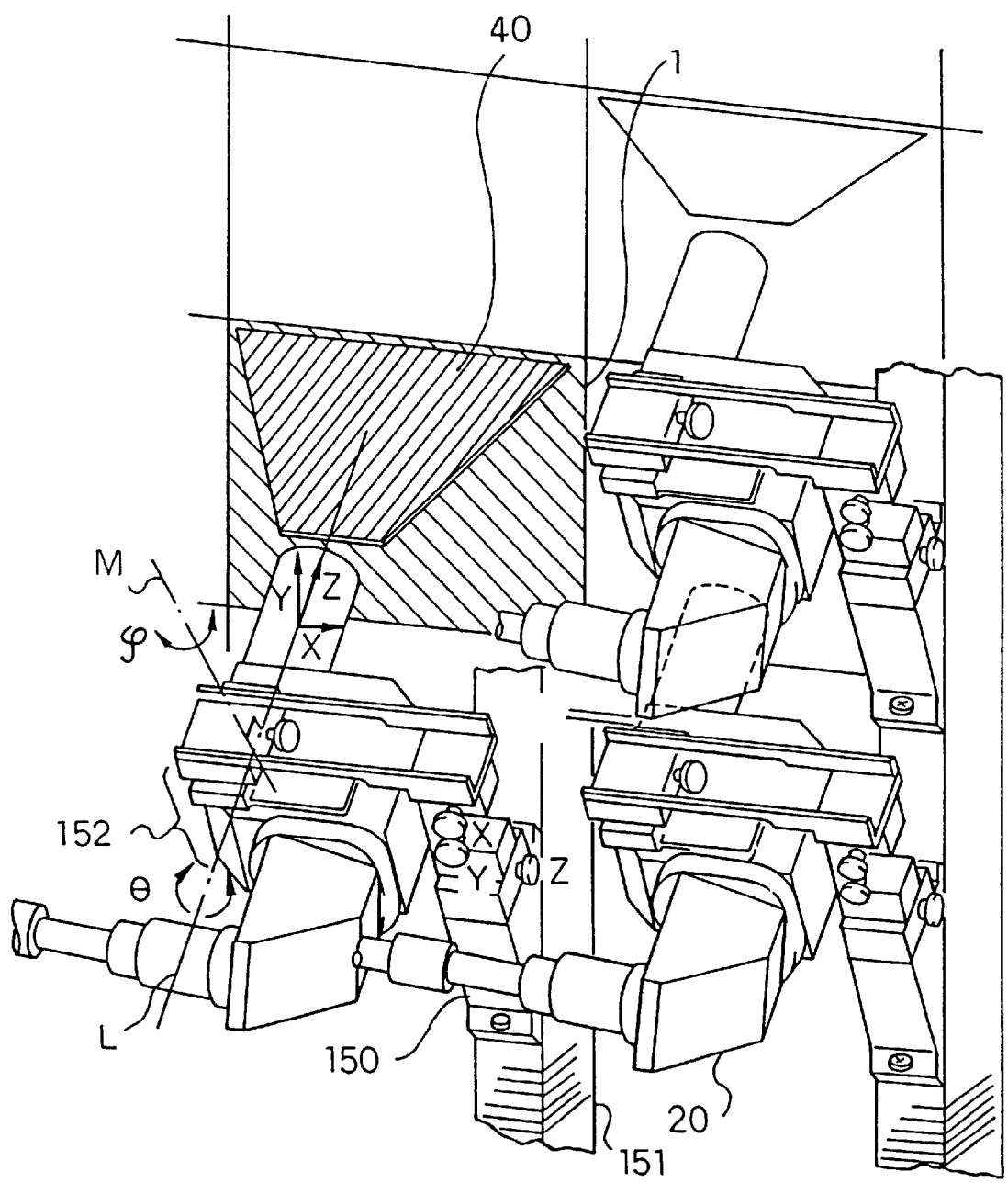
FIG. 36 shows an adjustment system of a projection unit according to the present invention.

FIG. 36 shows the adjustment system of the projection unit 120 according to the present invention. The adjustment system consists of the adjustment stage 150 which can independently move along X-axis, Y-axis and Z-axis, a fixing arm 151 and a goniostage 152 connected to the arm 151. The adjustment stage 150 moves and adjusts an image display position from the projection unit 120 parallel with the surface of the screen 1, along the X or Y direction. In addition, when the adjustment stage 150 moves the projection unit 120 back and forth along the Z direction, it is possible to make size of projected image be specific. The goniostage 152 has function of rotating a projected image from the projection unit 120 along θ direction with respect to an optical axis L of the projection unit and along φ direction with respect to a M-axis which is vertical against the optical axis L. It is possible to link plural images projected on the screen 1 without any joints, by adjusting these five axes: X, Y, Z, L and M.

Figure 37:
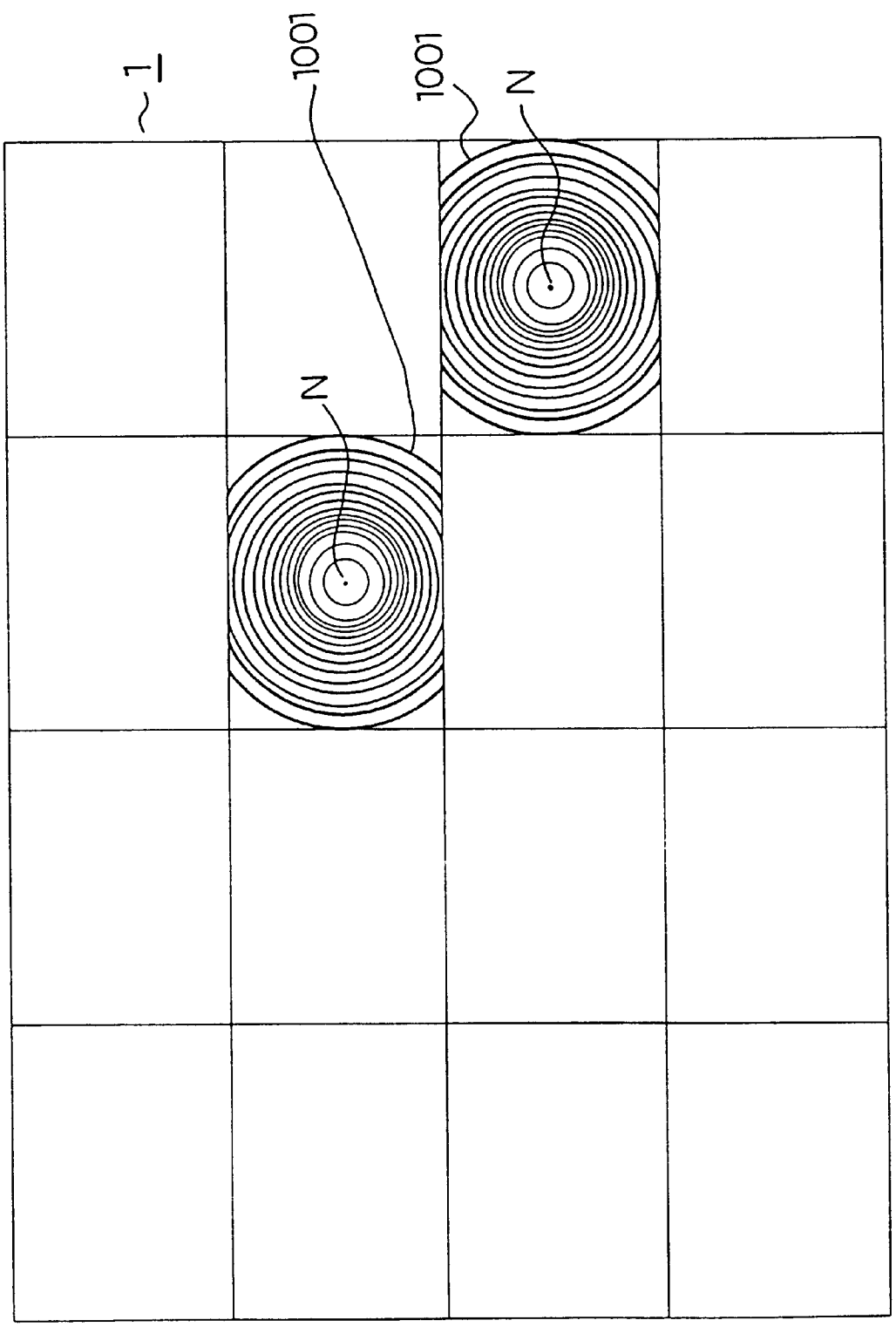
FIG. 37 shows an example of plural Fresnel lenses according to the present invention.

FIG. 37 shows a configuration of the screen 1 wherein Fresnel lenses 1001 arrayed at 4×4 are installed. When the location of the Fresnel lens is moved by thermal change, the adjustment stage 150 and the goniostage 152 control the optical axis L of the projection unit 120 to be corresponding to an optical axis N of the Fresnel lens, based on a signal from the a sensor (not shown) which senses a border of neighboring projected images. Namely, even when the location of the Fresnel lens is moved by thermal change, a connected image can be obtained without any joint at the border of neighboring images, by feed-back-controlling the projection unit.

Regarding the inside of the projection unit 120, though not shown in FIGS. 34 through 36, it is acceptable there to be one, two, or plural liquid crystal panels in one projection unit. For example, it is acceptable for the projection unit to synthesize lights from the liquid crystal panels for red, blue, and green, inside the unit, in order to generate an image.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. An image display system comprising:
   a plurality of liquid crystal modules for generating a plurality of partial images which constitute different areas of a whole image, each liquid crystal module including a luminance liquid crystal panel for primarily providing a luminance component of a partial image and a color liquid crystal panel for primarily providing a color component of the partial image;
   a screen for displaying the plurality of partial images generated by the plurality of liquid crystal modules on different areas of the screen to form the whole image;
   a plurality of dual lens arrangements associated with the liquid crystal modules, each dual lens arrangement aligned to superimpose a partial luminance image with a partial color image to form one of the partial images; and
   a light supplier for supplying light to the liquid crystal panel at each of the plurality of liquid crystal modules.

2. The image display system of claim 1, wherein each dual lens arrangement receives light transmitted through the luminance liquid crystal panel and light transmitted through the color liquid crystal panel, each of the dual lens arrangements focusing the received light to synthesize the partial image.

3. The image display system of claim 2, wherein each of the plurality of liquid crystal modules further includes a polarization beam splitter for distributing light supplied by the light supplier to the color liquid crystal panel for color and the luminance liquid crystal panel for luminance.

4. The image display system of claim 3, wherein each of the plurality of liquid crystal modules further includes a reflective board which is unified with the polarization beam splitter.

5. The image display system of claim 1, wherein each of the plurality of liquid crystal modules includes the dual lens arrangement for projecting the partial image generated by the liquid crystal panels, and a reflective mirror located between the screen and the dual lens arrangement.

6. The image display system of claim 1, wherein the screen is a panel containing a diffusing material.

7. The image display system of claim 1, wherein the screen is curved inside.

8. The image display system of claim 1, wherein the screen includes a plurality of partial screens respectively corresponding to each of the plurality of liquid crystal modules.

9. The image display system of claim 1 further includes a cabinet in which the plurality of liquid crystal modules is detachably arranged.

10. The image display system of claim 1 further includes a light shielding board for shielding light output from each of the plurality of liquid crystal modules, at a border of neighboring liquid crystal modules whose partial images are next to each other on the screen.

11. The image display system according to claim 1 wherein the light supplier is optically coupled to an optical fiber cable having a light-transmissive end, and wherein the color liquid crystal panel is located closer to the light-transmissive end than the luminance liquid crystal panel.

12. An image display system comprising:
a plurality of liquid crystal modules for generating a plurality of partial images which constitute different areas of a whole image, each liquid crystal module including a luminance liquid crystal panel for primarily providing a luminance component of a partial image and a color liquid crystal panel for primarily providing a color component of the partial image;
a screen for displaying the plurality of partial images generated by the plurality of liquid crystal modules on different areas of the screen to form the whole image;
a light supplier for supplying light to the liquid crystal panel at each of the plurality of liquid crystal modules, the light supplier including at least one light source, for radiating light to the plurality of liquid crystal modules, and a distributor for distributing the light radiated from the at least one light source through optical fiber cables to the plurality of liquid crystal modules.

13. The image display system of claim 12, wherein each of the plurality of optical fiber cables includes a plastic fiber.

14. The image display system of claim 12, wherein each of the plurality of optical fiber cables includes a plurality of optical fibers.

15. The image display system of claim 14, wherein each of the plurality of optical fiber cables composes a polygonal section at a side of each of the liquid crystal modules by using the plurality of fibers,
wherein the polygonal section composed of the plurality of fibers at the side of each of the liquid crystal modules is similar to a panel shape of the liquid crystal panel.

16. The image display system of claim 12, wherein the light supplier further includes a collector for collecting circumferential light and outputting collected circumferential light.

17. An image display system comprising:
a plurality of liquid crystal modules, each of which includes a liquid crystal panel, for generating a plurality of partial images which constitute different areas of a whole image;
a screen for displaying the plurality of partial images generated by the plurality of liquid crystal modules on different areas of the screen to form the whole image;
a light supplier for supplying light to the liquid crystal panel at each of the plurality of liquid crystal modules; and
a signal processing part for generating a plurality of partial image signals, which respectively generate the plurality of partial images for the plurality of liquid crystal modules,
wherein the signal processing part includes a bus for transmitting an image signal, and a plurality of processors, respectively corresponding to each of the plurality of liquid crystal modules, for inputting the image signal from the bus, selecting a partial image signal corresponding to each of the plurality of liquid crystal modules, and outputting a selected partial image signal.

18. The image display system of claim 17, wherein each of the plurality of processors further includes a corrective circuit for correcting the partial image signal based on a display feature of each of the plurality of liquid crystal modules.

19. The image display system of claim 17, wherein each of the plurality of processors converts the partial image signal to a signal based on an area gradation method, and the liquid crystal panels generate the plurality of partial images based on the area gradation method.

20. The image display system of claim 17, wherein the signal processing part further includes a controller, connected to the bus, which controls the plurality of processors on indicating portions of the image signal to be selected, and each of the plurality of processors selects the partial image signal indicated by the controller.

21. An image display system comprising:
a light source for providing light;
a plurality of liquid crystal panel groups having at least one translucent region for transmitting the light from the light source so as to form a luminance partial image and a color partial image, each of said liquid crystal panel groups including a first liquid crystal panel primarily providing a luminance component for the luminance partial image and a second liquid crystal panel primarily providing a chrominance component for the color partial image;
a plurality of dual lens arrangements for receiving the transmitted light from the corresponding groups of the liquid crystal panels, each dual lens arrangement aligned to superimpose the partial luminance image with a partial color image to form one of the partial images of an entire image;
a screen for displaying the entire image.

22. The image display system according to claim 21 further comprising:
a polarization beam splitter for distributing light supplied by the light source to the plurality of liquid crystal panel groups.

23. The image display system according to claim 21 wherein each of the liquid crystal panel groups includes reflectors.

24. The image display system according to claim 21 wherein the screen comprises a panel composed of an optically diffusive material.

25. The image display system according to claim 21 wherein a viewing surface of the screen is generally concave.

26. The image display system according to claim 21 wherein the screen comprises a plurality of modular cooperating screen sections, each modular screen section associated with a corresponding liquid crystal panel group.

27. The image display system according to claim 21 wherein the light source includes a central light source coupled to optical fibers for distributing light to the plurality of liquid crystal panels.

28. The image display system according to claim 21 further comprising a signal processor for generating output signals of partial images for corresponding groups of liquid crystal panels, the signal processor adapted to generate the output signals from an input signal of an entire image.

* * * * *